(12) United States Patent
Takeda et al.

(10) Patent No.: US 12,543,211 B2
(45) Date of Patent: Feb. 3, 2026

(54) TECHNIQUES FOR REFERENCE SIGNAL INTERFERENCE CANCELING OR RATE MATCHING

(71) Applicant: QUALCOMM Incorporated, San Diego, CA (US)

(72) Inventors: Kazuki Takeda, Minato-ku (JP); Alberto Rico Alvarino, San Diego, CA (US); Peter Gaal, San Diego, CA (US); Valentin Alexandru Gheorghiu, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 18/399,038

(22) Filed: Dec. 28, 2023

(65) Prior Publication Data

US 2024/0137968 A1    Apr. 25, 2024

Related U.S. Application Data

(62) Division of application No. 17/452,119, filed on Oct. 25, 2021, now Pat. No. 11,895,690.

(Continued)

(51) Int. Cl.
*H04W 72/542*    (2023.01)
*H04L 5/00*    (2006.01)
(Continued)

(52) U.S. Cl.
CPC ......... *H04W 72/542* (2023.01); *H04L 5/0032* (2013.01); *H04W 72/1215* (2013.01); *H04W 88/06* (2013.01)

(58) Field of Classification Search
CPC ........... H04W 72/542; H04W 72/1215; H04W 24/08; H04W 88/06; H04J 11/005;
(Continued)

(56) References Cited

U.S. PATENT DOCUMENTS

2019/0037579 A1\*   1/2019   Yi .............................. H04L 1/00
2020/0169902 A1     5/2020   Yasukawa et al.
(Continued)

FOREIGN PATENT DOCUMENTS

WO        2020261095 A1    12/2020
WO    WO-2021244561 A1 \*  12/2021   ............ H04W 24/10

OTHER PUBLICATIONS

Davydov A., et al., "Enhanced Interference Cancellation of Cell-Specific Reference Signals for LTE-A", 2015 IEEE 82nd Vehicular Technology Conference (VTC2015-Fall), Sep. 2015, 5 pages.

(Continued)

*Primary Examiner* — Siu M Lee
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may receive, from a base station, information that identifies an association between a first cell of a first radio access technology (RAT) and a second cell of a second RAT. The UE may perform a measurement for the first cell. The UE may determine that the measurement for the first cell satisfies a threshold value. The UE may perform an interference canceling operation for a reference signal of the second cell, or a de-weighting operation for one or more resource elements in which the reference signal interferes, based at least in part on the determination that the measurement for the first cell satisfies the threshold value and the association between the first cell and the second cell. Numerous other aspects are described.

30 Claims, 14 Drawing Sheets

Related U.S. Application Data

(60) Provisional application No. 63/200,859, filed on Mar. 31, 2021.

(51) Int. Cl.
*H04W 72/12* (2023.01)
*H04W 88/06* (2009.01)

(58) Field of Classification Search
CPC .. H04J 11/0093; H04B 7/0695; H04L 1/0013; H04L 5/001; H04L 5/0032; H04L 5/0051
See application file for complete search history.

(56) References Cited

U.S. PATENT DOCUMENTS

| | | | |
|---|---|---|---|
| 2020/0295895 A1* | 9/2020 | Wu | H04W 72/21 |
| 2021/0127378 A1* | 4/2021 | Pezeshki | H04L 5/0062 |
| 2022/0182844 A1 | 6/2022 | Park et al. | |
| 2022/0210662 A1 | 6/2022 | Wang et al. | |
| 2022/0304026 A1 | 9/2022 | Molavianjazi et al. | |
| 2022/0322130 A1* | 10/2022 | Muruganathan | H04L 5/005 |
| 2022/0322372 A1 | 10/2022 | Takeda et al. | |
| 2024/0056828 A1* | 2/2024 | Gutierrez Gonzalez | H04W 16/14 |
| 2024/0080132 A1* | 3/2024 | Atawia | H04L 5/0094 |

OTHER PUBLICATIONS

International Search Report and Written Opinion—PCT/US2022/070920—ISA/EPO—Aug. 4, 2022.

Mediatek Inc: "Discussion on DSS for LTE CRS Interference Handling", 3GPP TSG RAN#91E, RP-210646, 3rd Generation Partnership Project, Mobile Competence Centre, 650, Route Des Lucioles, F-06921 Sophia-Antipolis Cedex, France, vol. TSG RAN, No. 20210301, Agenda Item 9.7.17, pp. 1-8, Mar. 15, 2021, XP051986070, p. 1, p. 3, p. 7.

Qualcomm: "Discussion of LTE CRS-IC for DSS", 3GPP TSG-RAN Meeting #91e, RP-210350, 3rd Generation Partnership Project, Mobile Competence Centre, 650, Route Des Lucioles, F-06921 Sophia-Antipolis Cedex, France, vol. TSG RAN, No. Mar. 16, 2021-Mar. 26, 2021, Mar. 15, 2021 XP051985703, pp. 1-9.

* cited by examiner

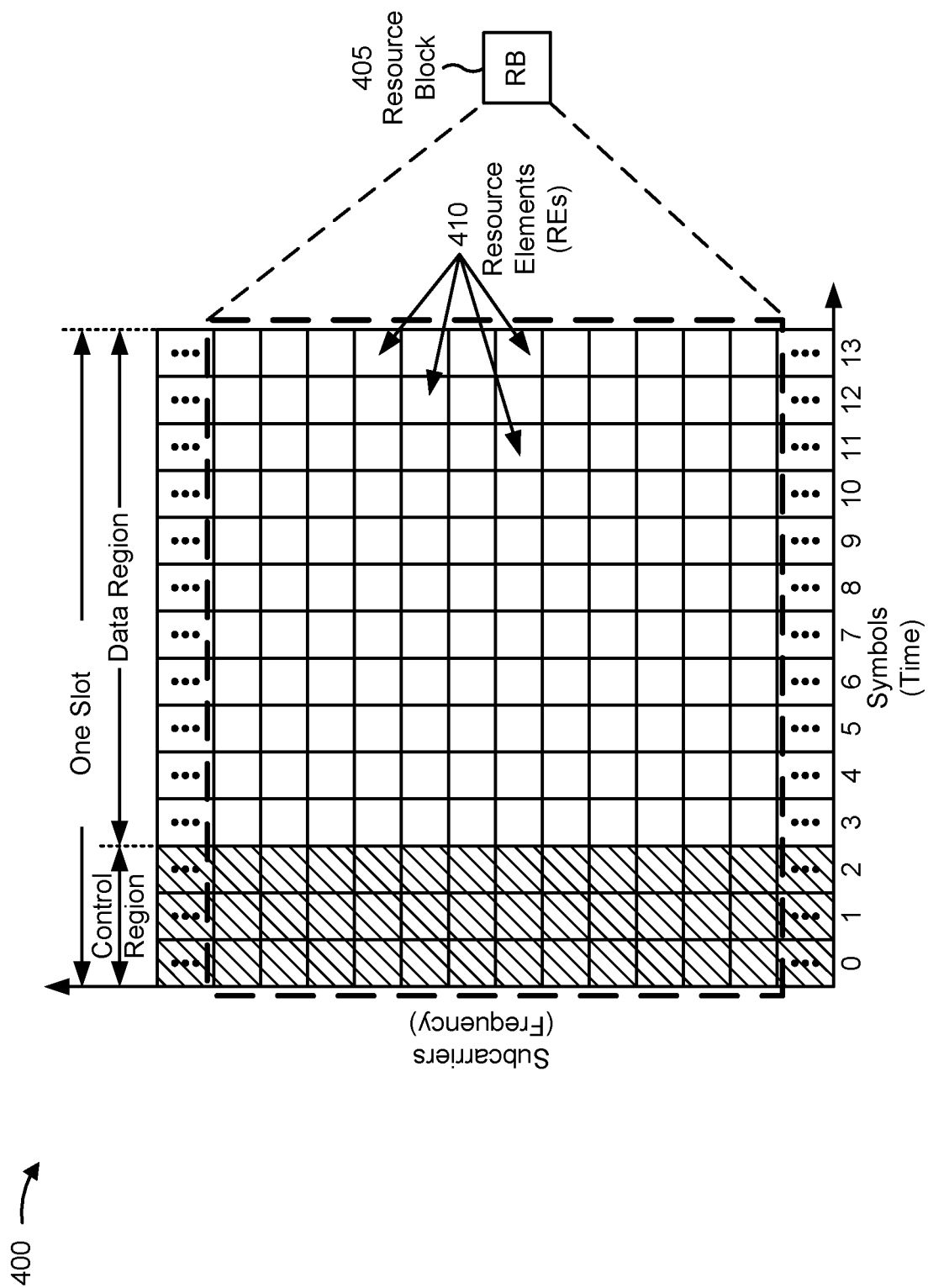

TECHNIQUES FOR REFERENCE SIGNAL INTERFERENCE CANCELING OR RATE MATCHING

CROSS-REFERENCE TO RELATED APPLICATIONS

This Patent Application is a divisional of U.S. patent application Ser. No. 17/452,119, filed on Oct. 25, 2021, entitled "TECHNIQUES FOR REFERENCE SIGNAL INTERFERENCE CANCELING OR RATE MATCHING," which claims priority to U.S. Provisional Patent Application No. 63/200,859, filed on Mar. 31, 2021, entitled "TECHNIQUES FOR REFERENCE SIGNAL INTERFERENCE CANCELING OR RATE MATCHING," and assigned to the assignee hereof. The disclosures of the prior Applications are considered part of and are incorporated by reference into this Patent Application.

FIELD OF THE DISCLOSURE

Aspects of the present disclosure generally relate to wireless communication and to techniques and apparatuses for reference signal interference canceling or rate matching.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a base station, information that identifies an association between a first cell of a first radio access technology (RAT) and a second cell of a second RAT; performing a measurement for the first cell; determining that the measurement for the first cell satisfies a threshold value; and performing an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

In some aspects, the reference signal is a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the method includes receiving information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the interference canceling operation is performed based at least in part on the configuration for the cell-specific reference signals.

In some aspects, the method includes receiving information that identifies at least one of a timing offset or a power offset between a downlink signal of the first cell and the reference signal of the second cell.

In some aspects, the method includes receiving information identifying one or more cells of the first RAT for which the UE is to perform measurements, the one or more cells including the first cell.

In some aspects, performing the interference canceling operation comprises: generating a replica of an interference signal; and performing subtraction of the replica of the interference signal from the one or more resource elements.

In some aspects, the first cell and the second cell use an orthogonal frequency division multiplexing (OFDM)-based waveform and a same subcarrier spacing.

In some aspects, the method includes receiving a physical downlink shared channel (PDSCH) transmission on the first cell, the interference canceling operation being performed when the PDSCH transmission is received.

In some aspects, a method of wireless communication performed by a base station includes generating information that identifies an association between a first cell of a first RAT and a second cell of a second RAT; and transmitting, to a UE, the information that identifies the association between the first cell of the first RAT and the second cell of the second RAT.

In some aspects, the first RAT is a New Radio RAT and the second RAT is an Evolved Universal Mobile Telecommunications System Terrestrial Radio Access RAT.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the method includes transmitting information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the method includes transmitting information that identifies at least one of a timing offset or a power offset between a downlink signal of the first cell and a reference signal of the second cell.

In some aspects, the method includes transmitting information identifying one or more cells of the first RAT for which the UE is to perform measurements, the one or more cells including the first cell.

In some aspects, the first cell and the second cell use an OFDM-based waveform and a same subcarrier spacing.

In some aspects, a method of wireless communication performed by a UE includes transmitting, to a base station, a measurement for a first cell of a first RAT; and receiving, from the base station, a configuration for rate matching around one or more reference signals of a second cell of a second RAT based at least in part on the measurement for the first cell satisfying a threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the method includes receiving information identifying one or more cells of the first RAT for which the UE is to perform measurements, the one or more cells including the first cell.

In some aspects, the first cell and the second cell use an OFDM-based waveform and a same subcarrier spacing.

In some aspects, the method includes receiving a PDSCH transmission on the first cell using the configuration for rate matching.

In some aspects, a method of wireless communication performed by a base station includes receiving, from a UE, a measurement for a first cell of a first RAT; determining that the measurement for the first cell satisfies a threshold value; and transmitting, to the UE, a configuration for rate matching around one or more reference signals of a second cell of a second RAT based at least in part on the determination that the measurement for the first cell satisfies the threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the method includes transmitting information identifying one or more cells of the first RAT for which the UE is to perform measurements, the one or more cells including the first cell.

In some aspects, the first cell and the second cell use an OFDM-based waveform and a same subcarrier spacing.

In some aspects, a UE for wireless communication includes a memory and one or more processors, coupled to the memory, configured to: receive, from a base station, information that identifies an association between a first cell of a first RAT and a second cell of a second RAT; perform a measurement for the first cell; determine that the measurement for the first cell satisfies a threshold value; and perform an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

In some aspects, the reference signal is a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more processors are further configured to: receive information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the interference canceling operation is performed based at least in part on the configuration for the cell-specific reference signals.

In some aspects, the one or more processors are further configured to: receive information that identifies at least one of a timing offset or a power offset between a downlink signal of the first cell and the reference signal of the second cell.

In some aspects, the one or more processors are further configured to: receive information identifying one or more cells of the first RAT for which the UE is to perform measurements, the one or more cells including the first cell.

In some aspects, the one or more processors, to perform the interference canceling operation, are configured to: generate a replica of an interference signal; and perform subtraction of the replica of the interference signal from the one or more resource elements.

In some aspects, the first cell and the second cell use an OFDM-based waveform and a same subcarrier spacing.

In some aspects, the one or more processors are further configured to receive a PDSCH transmission on the first cell, the interference canceling operation being performed when the PDSCH transmission is received.

In some aspects, a base station for wireless communication includes a memory and one or more processors, coupled to the memory, configured to: generate information that identifies an association between a first cell of a first RAT and a second cell of a second RAT; and transmit, to a UE, the information that identifies the association between the first cell of the first RAT and the second cell of the second RAT.

In some aspects, the first RAT is a New Radio RAT and the second RAT is an Evolved Universal Mobile Telecommunications System Terrestrial Radio Access RAT.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more processors are further configured to: transmit information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the one or more processors are further configured to: transmit information that identifies at least one of a timing offset or a power offset between a downlink signal of the first cell and a reference signal of the second cell.

In some aspects, the one or more processors are further configured to: transmit information identifying one or more cells of the first RAT for which the UE is to perform measurements, the one or more cells including the first cell.

In some aspects, the first cell and the second cell use an OFDM-based waveform and a same subcarrier spacing.

In some aspects, a UE for wireless communication includes a memory and one or more processors, coupled to the memory, configured to: transmit, to a base station, a measurement for a first cell of a first RAT; and receive, from the base station, a configuration for rate matching around one or more reference signals of a second cell of a second RAT based at least in part on the measurement for the first cell satisfying a threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more processors are further configured to: receive information identifying one or more cells of the first RAT for which the UE is to perform measurements, the one or more cells including the first cell.

In some aspects, the first cell and the second cell use an OFDM-based waveform and a same subcarrier spacing.

In some aspects, the one or more processors are further configured to receive a PDSCH transmission on the first cell using the configuration for rate matching.

In some aspects, a base station for wireless communication includes a memory and one or more processors, coupled to the memory, configured to: receive, from a UE, a measurement for a first cell of a first RAT; determine that the measurement for the first cell satisfies a threshold value; and transmit, to the UE, a configuration for rate matching around one or more reference signals of a second cell of a second RAT based at least in part on the determination that the measurement for the first cell satisfies the threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more processors are further configured to: transmit information identifying one or more cells of the first RAT for which the UE is to perform measurements, the one or more cells including the first cell.

In some aspects, the first cell and the second cell use an OFDM-based waveform and a same subcarrier spacing.

In some aspects, a non-transitory computer-readable medium storing a set of instructions for wireless communication includes one or more instructions that, when executed by one or more processors of a UE, cause the UE to: receive, from a base station, information that identifies an association between a first cell of a first RAT and a second cell of a second RAT; perform a measurement for the first cell; determine that the measurement for the first cell satisfies a threshold value; and perform an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

In some aspects, the reference signal is a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more instructions further cause the UE to: receive information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the interference canceling operation is performed based at least in part on the configuration for the cell-specific reference signals.

In some aspects, the one or more instructions further cause the UE to: receive information that identifies at least one of a timing offset or a power offset between a downlink signal of the first cell and the reference signal of the second cell.

In some aspects, the one or more instructions further cause the UE to: receive information identifying one or more cells of the first RAT for which the UE is to perform measurements, the one or more cells including the first cell.

In some aspects, the one or more instructions, that cause the UE to perform the interference canceling operation, cause the UE to: generate a replica of an interference signal; and perform subtraction of the replica of the interference signal from the one or more resource elements.

In some aspects, the first cell and the second cell use an OFDM-based waveform and a same subcarrier spacing.

In some aspects, the one or more instructions further cause the UE to receive a PDSCH transmission on the first cell, the interference canceling operation being performed when the PDSCH transmission is received.

In some aspects, a non-transitory computer-readable medium storing a set of instructions for wireless communication includes one or more instructions that, when executed by one or more processors of a base station, cause the base station to: generate information that identifies an association between a first cell of a first RAT and a second cell of a second RAT; and transmit, to a UE, the information that identifies the association between the first cell of the first RAT and the second cell of the second RAT.

In some aspects, the first RAT is a New Radio RAT and the second RAT is an Evolved Universal Mobile Telecommunications System Terrestrial Radio Access RAT.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more instructions further cause the base station to: transmit information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the one or more instructions further cause the base station to: transmit information that identifies at least one of a timing offset or a power offset between a downlink signal of the first cell and a reference signal of the second cell.

In some aspects, the one or more instructions further cause the base station to: transmit information identifying one or more cells of the first RAT for which the UE is to perform measurements, the one or more cells including the first cell.

In some aspects, the first cell and the second cell use an OFDM-based waveform and a same subcarrier spacing.

In some aspects, a non-transitory computer-readable medium storing a set of instructions for wireless communication includes one or more instructions that, when executed by one or more processors of a UE, cause the UE to: transmit, to a base station, a measurement for a first cell of a first RAT; and receive, from the base station, a configuration for rate matching around one or more reference signals of a second cell of a second RAT based at least in part on the measurement for the first cell satisfying a threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more instructions further cause the UE to: receive information identifying one or more cells of the first RAT for which the UE is to perform measurements, the one or more cells including the first cell.

In some aspects, the first cell and the second cell use an OFDM-based waveform and a same subcarrier spacing.

In some aspects, the one or more instructions further cause the UE to receive a PDSCH transmission on the first cell using the configuration for rate matching.

In some aspects, a non-transitory computer-readable medium storing a set of instructions for wireless communication includes one or more instructions that, when executed by one or more processors of a base station, cause the base station to: receive, from a UE, a measurement for a first cell of a first RAT; determine that the measurement for the first cell satisfies a threshold value; and transmit, to the UE, a configuration for rate matching around one or more reference signals of a second cell of a second RAT based at least in part on the determination that the measurement for the first cell satisfies the threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the one or more instructions further cause the base station to: transmit information identifying one or more cells of the first RAT for which the UE is to perform measurements, the one or more cells including the first cell.

In some aspects, the first cell and the second cell use an OFDM-based waveform and a same subcarrier spacing.

In some aspects, an apparatus for wireless communication includes means for receiving, from a base station, information that identifies an association between a first cell of a first RAT and a second cell of a second RAT; means for performing a measurement for the first cell; means for determining that the measurement for the first cell satisfies a threshold value; and means for performing an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

In some aspects, the reference signal is a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the apparatus includes means for receiving information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the interference canceling operation is performed based at least in part on the configuration for the cell-specific reference signals.

In some aspects, the apparatus includes means for receiving information that identifies at least one of a timing offset or a power offset between a downlink signal of the first cell and the reference signal of the second cell.

In some aspects, the apparatus includes means for receiving information identifying one or more cells of the first RAT for which the apparatus is to perform measurements, the one or more cells including the first cell.

In some aspects, the means for performing the interference canceling operation comprises: means for generating a replica of an interference signal; and means for performing subtraction of the replica of the interference signal from the one or more resource elements.

In some aspects, the first cell and the second cell use an OFDM-based waveform and a same subcarrier spacing.

In some aspects, the apparatus includes means for receiving a PDSCH transmission on the first cell, the interference canceling operation being performed when the PDSCH transmission is received.

In some aspects, an apparatus for wireless communication includes means for generating information that identifies an association between a first cell of a first RAT and a second cell of a second RAT; and means for transmitting, to a UE, the information that identifies the association between the first cell of the first RAT and the second cell of the second RAT.

In some aspects, the first RAT is a New Radio RAT and the second RAT is an Evolved Universal Mobile Telecommunications System Terrestrial Radio Access RAT.

In some aspects, the association between the first cell and the second cell associates the first cell and one or more beams of the second cell.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the apparatus includes means for transmitting information that identifies a configuration for cell-specific reference signals for the second cell.

In some aspects, the configuration identifies at least one of a cell identifier for the second cell, a v-shift parameter, a bandwidth associated with the second cell, or a number of cell-specific reference signal antenna ports.

In some aspects, the apparatus includes means for transmitting information that identifies at least one of a timing offset or a power offset between a downlink signal of the first cell and a reference signal of the second cell.

In some aspects, the apparatus includes means for transmitting information identifying one or more cells of the first RAT for which the UE is to perform measurements, the one or more cells including the first cell.

In some aspects, the first cell and the second cell use an OFDM-based waveform and a same subcarrier spacing.

In some aspects, an apparatus for wireless communication includes means for transmitting, to a base station, a measurement for a first cell of a first RAT; and means for receiving, from the base station, a configuration for rate matching around one or more reference signals of a second cell of a second RAT based at least in part on the measurement for the first cell satisfying a threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the apparatus includes means for receiving information identifying one or more cells of the first RAT for which the UE is to perform measurements, the one or more cells including the first cell.

In some aspects, the first cell and the second cell use an OFDM-based waveform and a same subcarrier spacing.

In some aspects, the apparatus includes means for receiving a PDSCH transmission on the first cell using the configuration for rate matching.

In some aspects, an apparatus for wireless communication includes means for receiving, from a UE, a measurement for a first cell of a first RAT; means for determining that the measurement for the first cell satisfies a threshold value; and means for transmitting, to the UE, a configuration for rate matching around one or more reference signals of a second cell of a second RAT based at least in part on the determination that the measurement for the first cell satisfies the threshold value and an association between the first cell and the second cell.

In some aspects, the one or more reference signals include a cell-specific reference signal, a channel state information reference signal, a primary synchronization signal, or a secondary synchronization signal.

In some aspects, the first RAT is a New Radio RAT and the second RAT is an Evolved Universal Mobile Telecommunications System Terrestrial Radio Access RAT.

In some aspects, the measurement for the first cell is of a synchronization signal block, a tracking reference signal, or a channel state information reference signal.

In some aspects, the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

In some aspects, the association between the first cell and the second cell indicates at least one of: the first cell and the second cell are time synchronized; the first cell and the second cell are co-located; or the first cell and the second cell use a same precoding.

In some aspects, the first cell and the second cell share downlink time and frequency resources.

In some aspects, the apparatus includes means for transmitting information identifying one or more cells of the first RAT for which the UE is to perform measurements, the one or more cells including the first cell.

In some aspects, the first cell and the second cell use an OFDM-based waveform and a same subcarrier spacing.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 4 is a diagram illustrating an example of a slot format, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
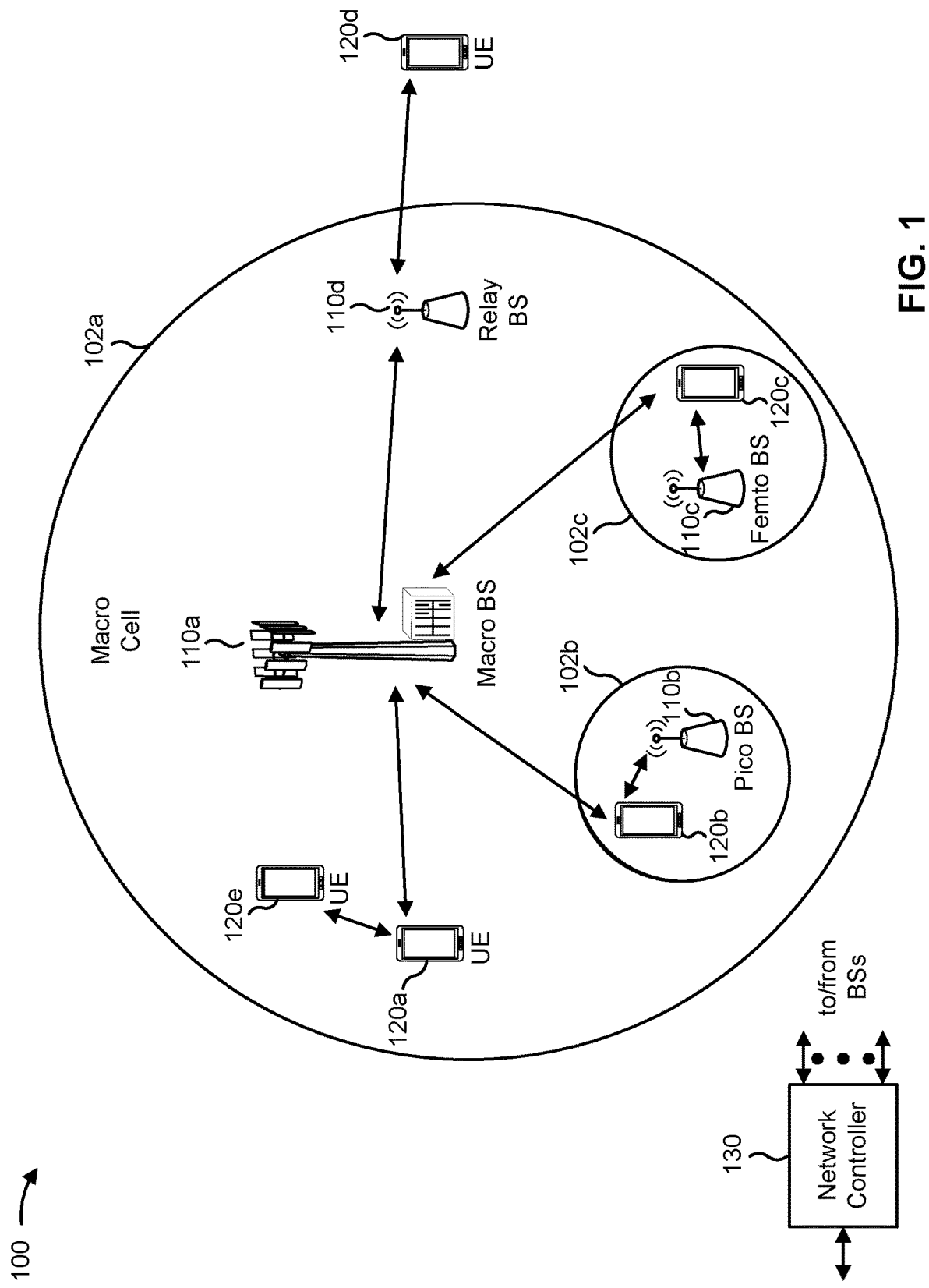
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
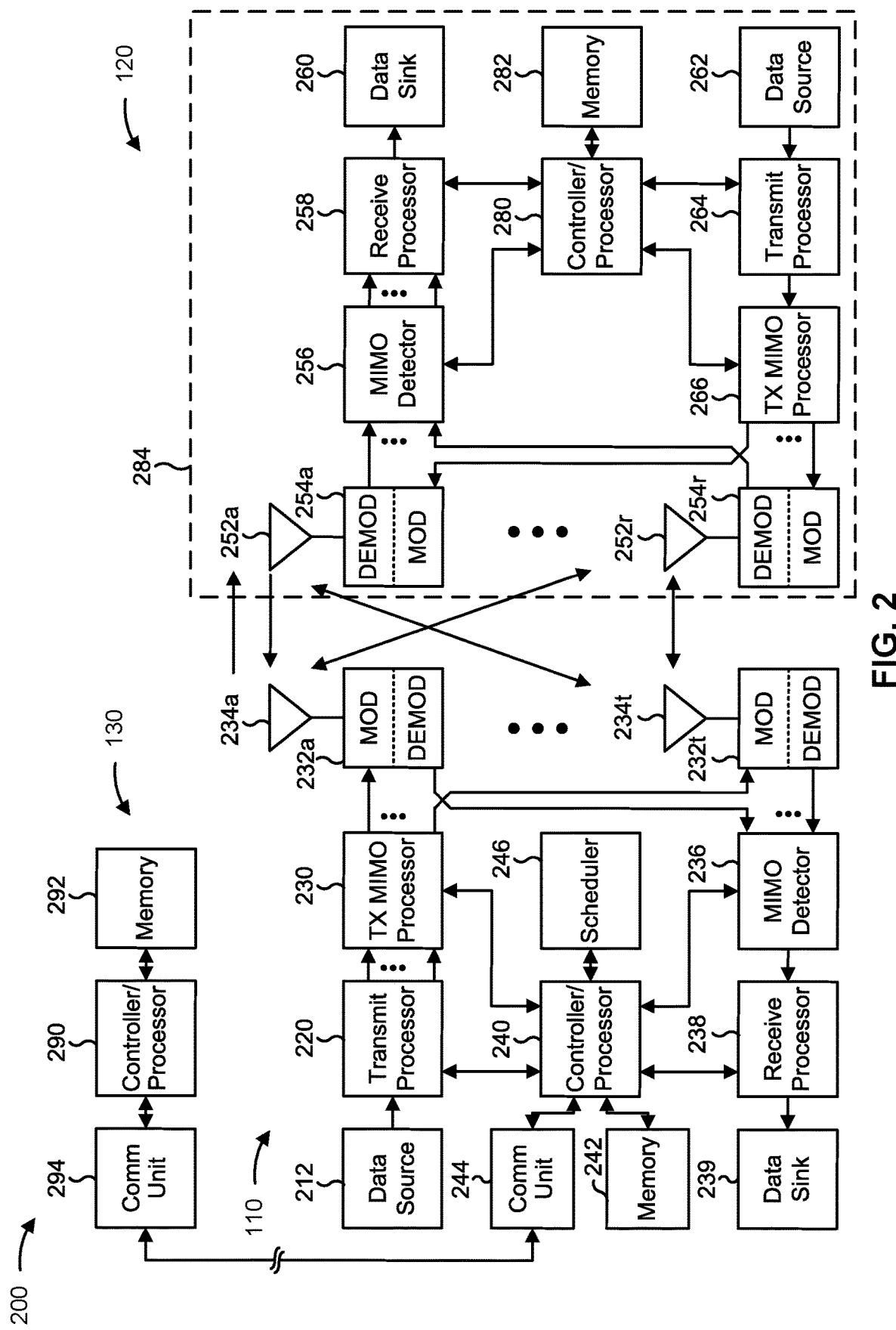
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to T modulators (MODs) 232a through 232t. Each modulator 232 may process a respective output symbol stream (e.g., for OFDM) to obtain an output sample stream. Each modulator 232 may further process (e.g., convert to analog, amplify, filter, and/or upconvert) the output sample stream to obtain a downlink signal. T downlink signals from modulators 232a through 232t may be transmitted via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to demodulators (DEMODs) 254a through 254r, respectively. Each demodulator 254 may condition (e.g., filter, amplify, downconvert, and/or digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by modulators 254a through 254r (e.g., for DFT-s-OFDM or CP-OFDM), and transmitted to the base station 110. In some examples, a modulator and a demodulator (e.g., MOD/DEMOD 254) of the UE 120 may be included in a modem of the UE 120. In some examples, the UE 120 includes a transceiver. The transceiver may include any combination of the antenna(s) 252, modulators and/or demodulators 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-13).

At the base station 110, the uplink signals from UE 120 and/or other UEs may be received by the antennas 234, processed by demodulators 232, detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, a modulator and a demodulator (e.g., MOD/DEMOD 232) of the base station 110 may be included in a modem of the base station 110. In some examples, the base station 110 includes a transceiver. The transceiver may include any combination of the antenna(s) 234, modulators and/or demodulators 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (for example, as described with reference to FIGS. 6-13).

The controller/processor 240 of the base station 110, the controller/processor 280 of the UE 120, and/or any other component(s) of FIG. 2 may perform one or more techniques associated with reference signal interference canceling or rate matching, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for receiving, from a base station, information that identifies an association between a first cell of a first RAT and a second cell of a second RAT; means for performing a measurement for the first cell; means for determining that the measurement for the first cell satisfies a threshold value; and/or means for performing an interference canceling operation for a reference signal of the second cell, or a de-weighting operation for one or more resource elements in which the reference signal interferes, based at least in part on the determination that the measurement for the first cell satisfies the threshold value and the association between the first cell and the second cell. Additionally, or alternatively, the UE includes means for transmitting, to a base station, a measurement for a first cell of a first RAT; and/or means for receiving, from the base station, a configuration for rate matching around one or more reference signals of a second cell of a second RAT based at least in part on the measurement for the first cell satisfying a threshold value and an association between the first cell and the second cell. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the base station includes means for generating information that identifies an association between a first cell of a first RAT and a second cell of a second RAT; and/or means for transmitting, to a UE, the information that identifies the association between the first cell of the first RAT and the second cell of the second RAT. Additionally, or alternatively, the base station includes means for receiving, from a UE, a measurement for a first cell of a first RAT; means for determining that the measurement for the first cell satisfies a threshold value; and/or means for transmitting, to the UE, a configuration for rate matching around one or more reference signals of a second cell of a second RAT based at least in part on the determination that the measurement for the first cell satisfies the threshold value and an association between the first cell and the second cell. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
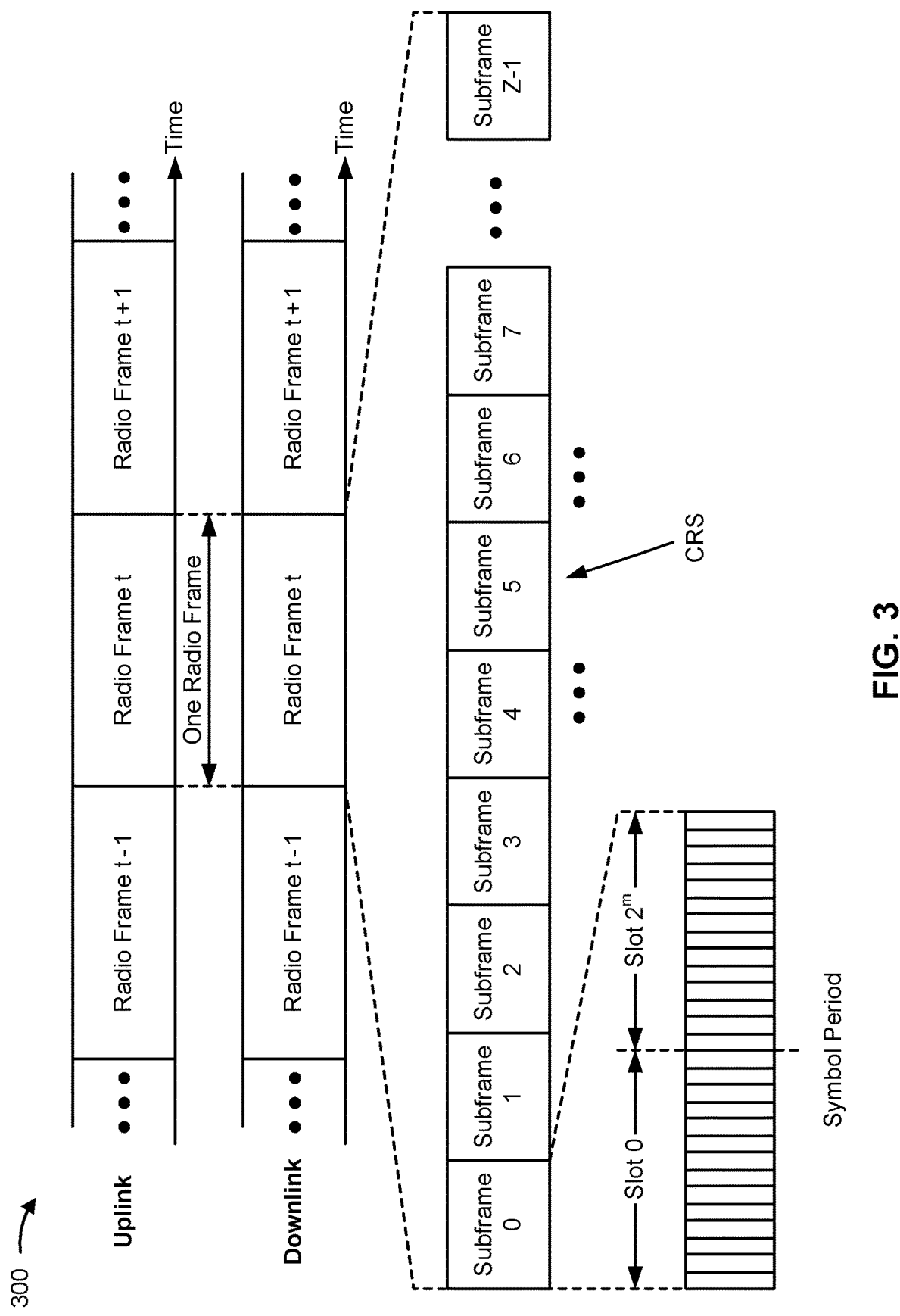
FIG. 3 is a diagram illustrating an example of a frame structure in a wireless communication network, in accordance with the present disclosure.

FIG. 3 is a diagram illustrating an example 300 of a frame structure in a wireless communication network, in accordance with the present disclosure. The frame structure shown in FIG. 3 is for frequency division duplexing (FDD) in a telecommunication system, such as Evolved Universal Mobile Telecommunications System Terrestrial Radio Access (E-UTRA) (i.e., LTE) or NR. The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., 2m slots per subframe are shown in FIG. 3, where m is an index of a numerology used for a transmission, such as 0, 1, 2, 3, 4, or another number). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some examples, a scheduling unit for the FDD may be frame-based, subframe-based, slot-based, mini-slot based, or symbol-based.

In some examples, in a telecommunication system using an LTE RAT, a cell-specific reference signal (CRS) may be in a subframe used for the downlink. For example, a CRS may be present in all downlink subframes, or in downlink pilot time slots (DwPTSs) of special subframes, unless a subframe is configured for a multicast-broadcast single-frequency network (MBSFN).

As indicated above, FIG. 3 is provided as an example. Other examples may differ from what is described with respect to FIG. 3.

FIG. 4 is a diagram illustrating an example 400 of a slot format, in accordance with the present disclosure. As shown in FIG. 4, time-frequency resources in a radio access network may be partitioned into resource blocks, shown by a single resource block (RB) 405. An RB 405 is sometimes referred to as a physical resource block (PRB). An RB 405 includes a set of subcarriers (e.g., 12 subcarriers) and a set of symbols (e.g., 14 symbols) that are schedulable by a base station 110 as a unit. In some examples, an RB 405 may include a set of subcarriers in a single slot. As shown, a single time-frequency resource included in an RB 405 may be referred to as a resource element (RE) 410. An RE 410 may include a single subcarrier (e.g., in frequency) and a single symbol (e.g., in time). A symbol may be referred to as an orthogonal frequency division multiplexing (OFDM) symbol. An RE 410 may be used to transmit one modulated symbol, which may be a real value or a complex value.

In some telecommunication systems (e.g., NR), RBs 405 may span 12 subcarriers with a subcarrier spacing of, for example, 15 kilohertz (kHz), 30 kHz, 60 kHz, or 120 kHz, among other examples, over a 0.1 millisecond (ms) duration. A radio frame may include 40 slots and may have a length of 10 ms. Consequently, each slot may have a length of 0.25 ms. However, a slot length may vary depending on a numerology used to communicate (e.g., a subcarrier spacing and/or a cyclic prefix format). A slot may be configured with a link direction (e.g., downlink or uplink) for transmission. In some examples, the link direction for a slot may be dynamically configured. In some examples, in a telecommunication system using an LTE RAT, an RE 410 may carry a CRS.

As indicated above, FIG. 4 is provided as an example. Other examples may differ from what is described with respect to FIG. 4.

Figure 5A:
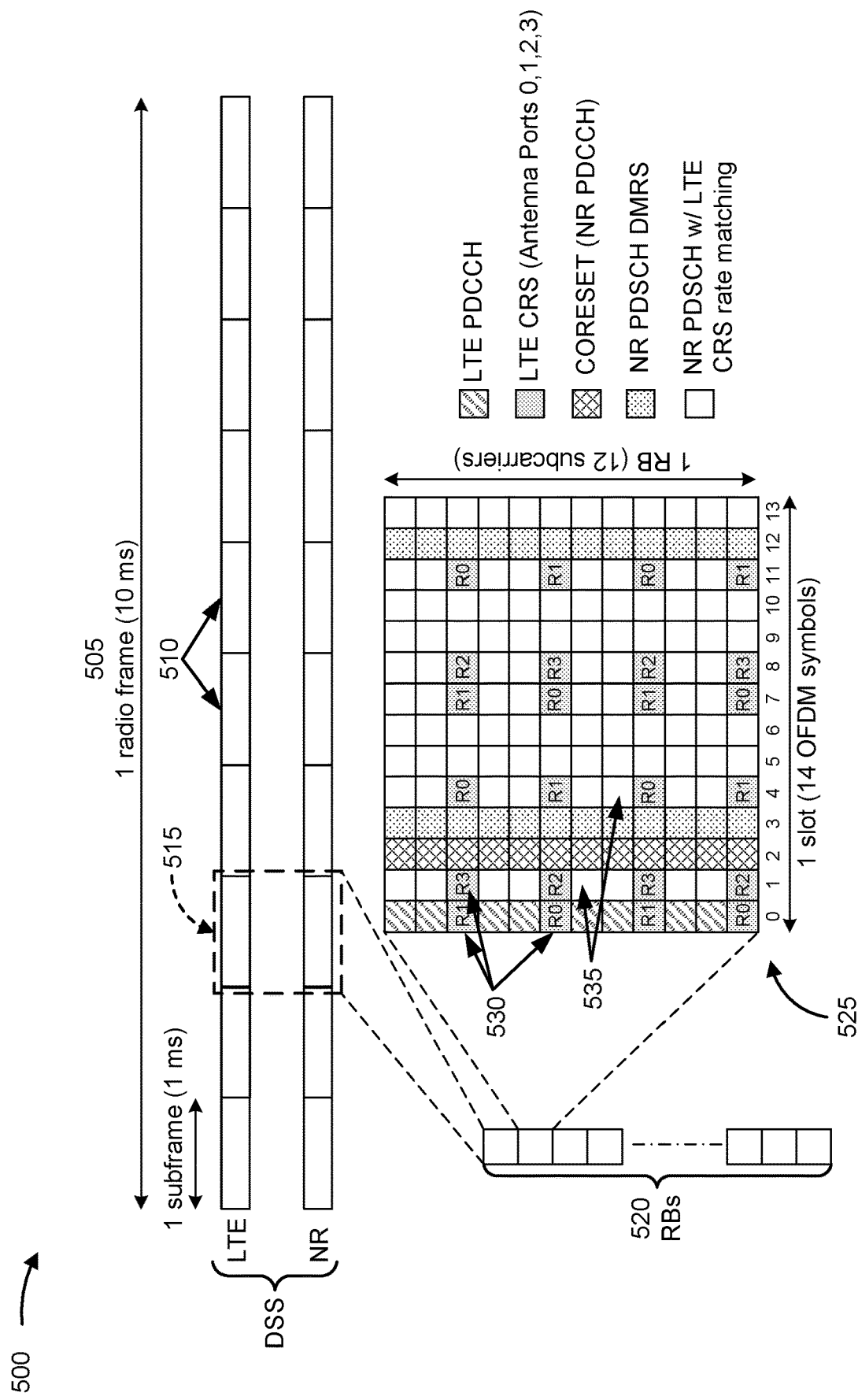
FIGS. 5A and 5B are diagrams illustrating examples of cell-specific reference signal (CRS) rate matching in dynamic spectrum sharing (DSS), in accordance with the present disclosure.

FIG. 5A is a diagram illustrating an example 500 of CRS rate-matching in dynamic spectrum sharing (DSS), in accordance with the present disclosure. DSS may enable a first RAT to share transmission resources with a second RAT. As shown in FIG. 5A, an LTE system and an NR system may dynamically share spectrum within a radio frame 505. The radio frame 505 may include a number of subframes 510. FIG. 5A illustrates how the LTE system and the NR system may dynamically share downlink time and frequency resources within a particular subframe 515.

As shown in FIG. 5A, the subframe 515 includes a number of RBs 520, each of which includes a number of different types of REs (e.g., REs that carry different types of signals or channels), as shown in the illustrated resource grid 525. Among others, the REs include LTE cell-specific reference signal (CRS) REs 530 and NR physical downlink shared channel (PDSCH) with LTE CRS rate-matching REs 535.

The LTE CRS REs 530 are used to carry CRSs. CRSs are used in LTE for cell search and initial acquisition, downlink channel quality measurements, and/or downlink channel estimation for coherent demodulation/detection at the UE. Because the LTE CRS REs 530 include CRSs for LTE, the LTE CRS REs 530 cannot be used to transmit data for NR (on the NR PDSCH) when time-frequency resources are being shared in DSS. Thus, when a base station schedules NR data in the RB 520, the base station performs rate-matching to refrain from transmitting NR data (on the NR PDSCH) in the LTE CRS REs 530 that include the LTE CRS, and the UE drops the LTE CRS REs 530 when decoding the NR data (e.g., by not using the information transmitted in the LTE CRS REs 530 when decoding the NR data, by ignoring the information transmitted in these REs 530 when decoding the NR data, by discarding the information transmitted in these REs 530 when decoding the NR data, or the like). The NR data transmitted on the NR PDSCH is, instead, transmitted in the NR PDSCH REs 535 with LTE CRS rate-matching. In this way, DSS operation is enabled by NR PDSCH rate matching around LTE CRS in the same serving cell.

As shown in FIG. 5A, in a shared DSS carrier, an NR PDSCH DMRS (e.g., of a Type-A PDSCH) may be shifted by one symbol. For example, in the absence of LTE/NR coexistence in connection with DSS, an NR DMRS pattern may include a DMRS in the fourth symbol (e.g., symbol index 3) of a slot and in the twelfth symbol (e.g., symbol index 11) of a slot. However, in the shared DSS carrier, an LTE CRS and an NR DMRS (e.g., according to the NR DMRS pattern) may overlap in a symbol (e.g., in the twelfth symbol of the slot). To avoid the overlap of the LTE CRS and the NR DMRS, the NR DMRS may be shifted by one symbol (e.g., to the thirteenth symbol of the slot, or symbol index 12). That is, the UE may be configured for DMRS shifting. Once DMRS shifting is configured for the UE, the DMRS may be shifted regardless of whether a collision with an LTE CRS would otherwise occur (e.g., the DMRS may be shifted even if a PDSCH RB is outside of an LTE CRS bandwidth and/or even in an LTE MBSFN subframe).

The NR DMRS may be shifted for a UE if the UE indicates (e.g., using an additionalDMRS-DL-Alt parameter) support for an alternative, additional DMRS position to enable coexistence with LTE CRS; if the UE is configured (e.g., radio resource control (RRC) configured) with a higher-layer parameter indicating a pattern for rate matching around LTE CRS (e.g., an lte-CRS-ToMatchAround parameter or an additionalLTE-CRS-ToMatchAroundList parameter); if three control symbols are used for the NR PDSCH; and if the UE is configured (e.g., RRC configured) with a higher-layer parameter indicating support for an additional DMRS position in symbol index 12 (e.g., a dmrs-AdditionalPosition parameter is set to "pos1").

As indicated above, FIG. 5A is provided as an example. Other examples may differ from what is described with respect to FIG. 5A.

Figure 5B:
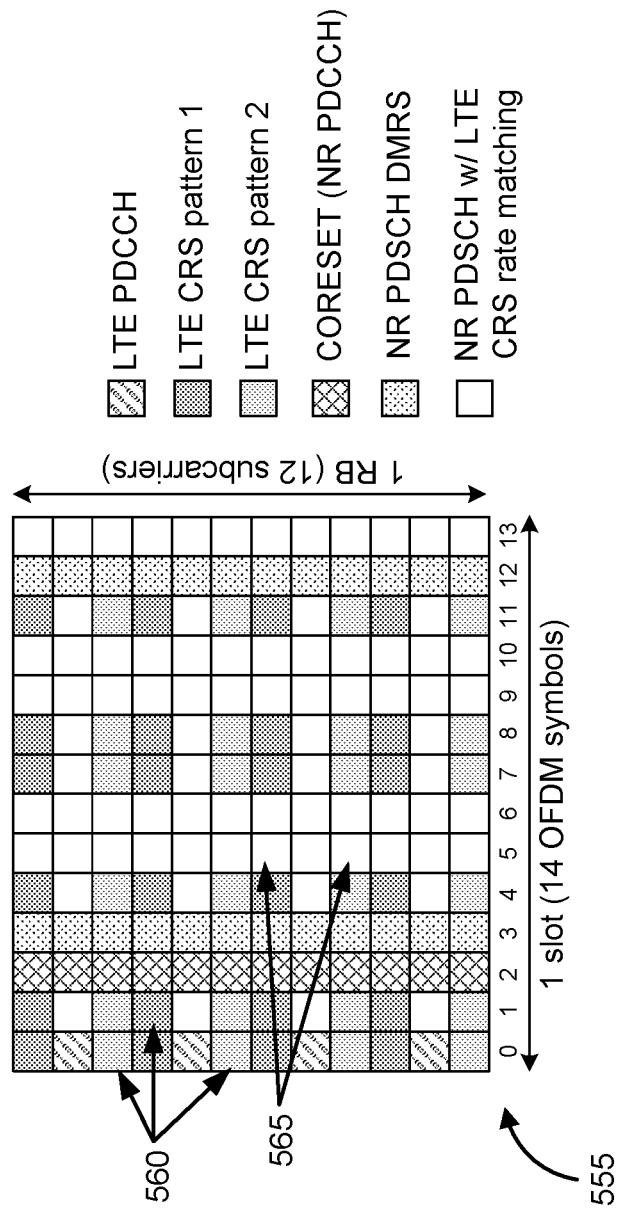

FIG. 5B is a diagram illustrating an example 550 of CRS rate-matching in DSS, in accordance with the present disclosure. As described above in connection with FIG. 5A, a subframe 515 includes a number of RBs, each of which includes a number of different types of REs (e.g., REs that carry different types of signals or channels), as shown in the illustrated resource grid 555. Among others, the REs include LTE CRS REs 560 and NR PDSCH with LTE CRS rate-matching REs 565, as described above.

As shown in FIG. 5B, an RB may include multiple LTE CRS patterns (shown as LTE CRS pattern 1 and LTE CRS pattern 2). That is, the RB may include LTE CRS for the CRSs of different cells. Thus, in DSS, when a base station schedules NR data in the RB, the base station performs rate-matching (e.g., within one NR carrier) to refrain from transmitting NR data (on the NR PDSCH) in the LTE CRS REs 560 for the multiple LTE CRS patterns, and the NR PDSCH is, instead, transmitted in the NR PDSCH REs 565 with LTE CRS rate-matching, as described above. In some examples, there may be multiple (e.g., up to two) LTE CRS patterns in an NR channel in a scenario involving multiple TRPs (mTRP). In another example, there may be multiple LTE CRS patterns in an NR channel (e.g., a wider band NR channel) that spans multiple LTE channels.

Accordingly, the NR PDSCH rate matching may be performed for multiple LTE CRS in one NR component carrier. For example, the NR PDSCH rate matching may use a rate matching pattern in order to rate match around the multiple LTE CRS patterns. In some examples, a maximum number of rate matching patterns (e.g., in total) within an NR carrier is six rate matching patterns. In some examples, a maximum number of non-overlapping rate matching patterns within an NR carrier is three rate matching patterns. In some examples, a maximum number of overlapping rate matching patterns, within a part of an NR carrier that overlaps with an LTE carrier, is two rate matching patterns.

A base station may transmit to a UE (e.g., via RRC signaling) a configuration that indicates a rate matching pattern for LTE CRS (e.g., that indicates the rate matching pattern that is to be used to rate match around LTE CRS). For example, the rate matching pattern may be configured in a RateMatchPatternLTE-CRS information element of the configuration, which may indicate a bandwidth of the LTE carrier (e.g., in a carrierBandwidthDL parameter), a center of the LTE carrier (e.g., in a carrierFreqDL parameter), an LTE MBSFN subframe configuration (e.g., in an mbsfn-SubframeConfigList parameter), a number of LTE CRS antenna ports to be rate matched around (e.g., in an nrofCRS-Ports parameter), and/or a shifting value (v-shift) in LTE for rate matching around LTE CRS (e.g., in a v-Shift parameter).

To configure a UE with a rate matching pattern, a base station must determine when to perform rate matching for LTE CRSs and/or for which LTE CRSs rate matching is to be performed. In some examples, the UE may perform measurement of LTE CRSs, and the UE may report (e.g., in a background manner) LTE CRS measurements to the base station in order to enable the base station 110 to determine when to perform rate matching for LTE CRSs and/or for which LTE CRSs rate matching is to be performed. However, LTE CRS measurement and reporting may be burdensome for the UE and consume excessive computing resources. Moreover, the LTE CRS measurement reporting may consume excessive network resources and increase signaling overhead.

In addition, in DSS, LTE CRS interference from one or more neighbor cells may adversely affect NR downlink performance. For example, the LTE CRS interference may significantly degrade NR downlink throughput. In some examples, a UE may use LTE CRS interference canceling for NR PDSCH reception. For example, a UE may identify strong LTE CRS interference from a neighbor cell (e.g., a signal strength of the LTE CRS satisfies a threshold value). Based at least in part on identifying the strong LTE CRS interference, the UE may determine to cancel the LTE CRS interference. To cancel the LTE CRS interference, the UE may estimate propagation channel coefficients from the neighbor cell; generate an interference replica based at least in part on the estimated propagation channel coefficients; and subtract the interference replica from an NR PDSCH received from the UE's serving cell.

Thus, to perform the interference cancellation, the UE may perform measurement of LTE CRS (e.g., in a background manner) in order to identify strong LTE CRS interference. However, as described above, LTE CRS measurement may be burdensome for the UE and consume excessive computing resources.

As indicated above, FIG. 5B is provided as an example. Other examples may differ from what is described with respect to FIG. 5B.

Figure 6:
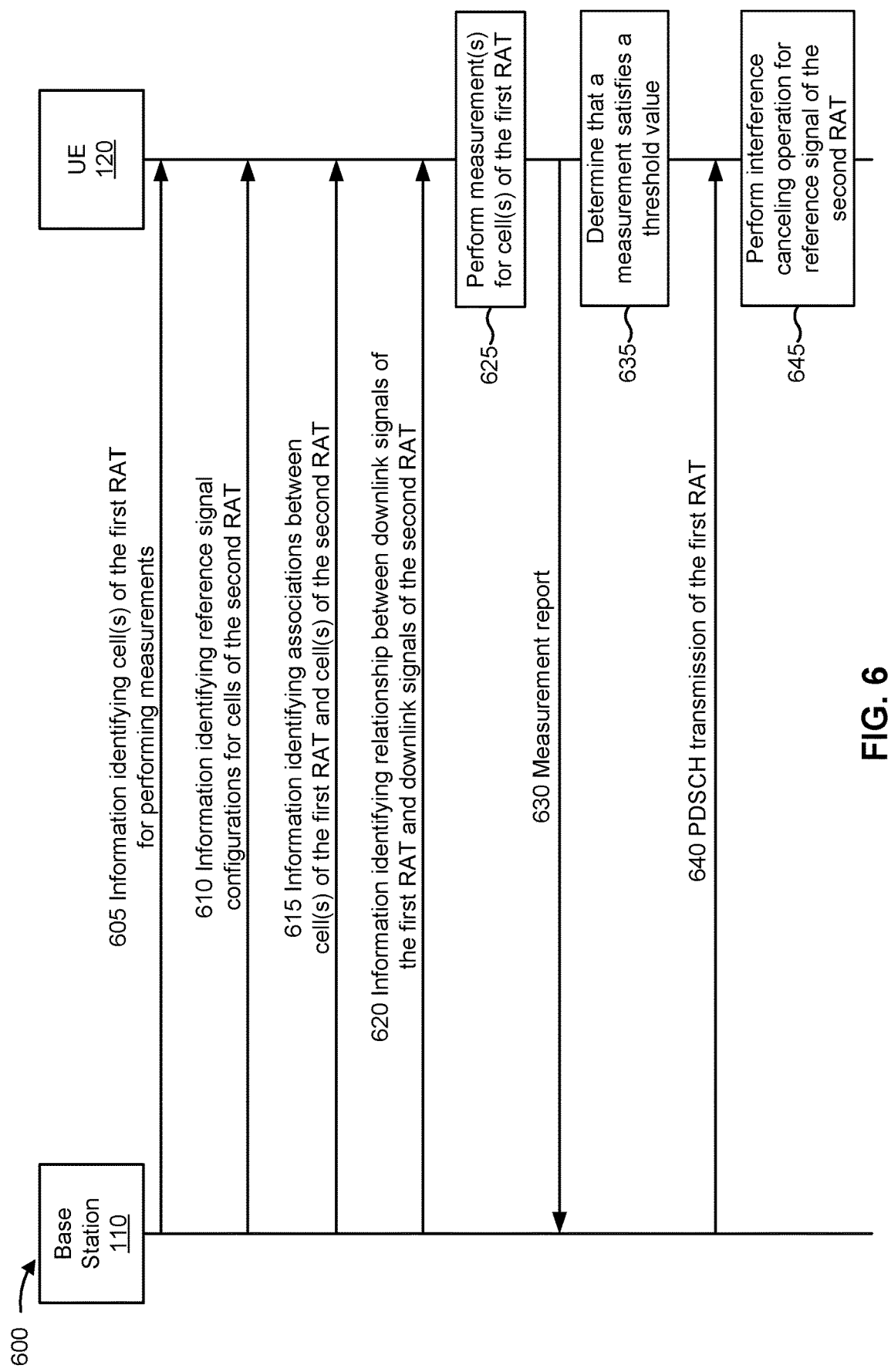
FIG. 6 is a diagram illustrating an example associated with reference signal interference canceling, in accordance with the present disclosure.

FIG. 6 is a diagram illustrating an example 600 associated with reference signal interference canceling, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and UE 120 may communicate via a wireless access link, which may include an uplink and a downlink.

In some aspects, the base station 110 may be operating in a DSS mode, as described above. For example, the base station 110 may implement a first cell of a first RAT (e.g., an NR RAT) and a second cell of a second RAT (e.g., an LTE, or E-UTRA, RAT). In some aspects, another base station 110 (e.g., a neighbor base station) may be operating in a DSS mode, and the other base station 110 may implement the first cell of the first RAT and the second cell of the second RAT. The first cell of the first RAT and the second cell of the second RAT may be implemented in a same frequency band, on a same carrier, or the like. In other words, the first cell and the second cell may share downlink time and frequency resources. Thus, a base station 110 may transmit (e.g., for a cell) downlink signals of the first RAT (e.g., NR downlink signals, such as a synchronization signal block (SSB), a tracking reference signals (TRS), a channel state information reference signal (CSI-RS), or the like) and downlink signals of the second RAT (e.g., LTE downlink signals, such as a CRS, a CSI-RS, a primary synchronization signal (PSS), a secondary synchronization signal (SSS), or the like) in a time synchronized and co-located (or quasi-co-located) manner. In some aspects, the first cell and the second cell may use an OFDM-based waveform and may use a same subcarrier spacing (e.g., 15 kHz).

As shown by reference number 605, the base station 110 may transmit, and the UE 120 may receive, information (e.g., a measurement configuration) identifying one or more cells of the first RAT (e.g., NR) for which the UE 120 is to perform measurements. For example, the UE 120 may receive a configuration that identifies a list of cells (e.g., a neighbor cell list) for measurement (e.g., NR radio resource management (RRM) measurement, such as SSB measurement, TRS measurement, and/or CSI-RS measurement). The one or more cells of the first RAT that the UE 120 is to measure may include the first cell. In some aspects, the information may identify one or more measurements that the UE 120 is to perform for the one or more cells of the first RAT.

As shown by reference number 610, the base station 110 may transmit, and the UE 120 may receive, information (e.g., one or more configurations) identifying respective reference signal configurations (e.g., identifying time and frequency resources for the reference signals) for one or more cells of the second RAT (e.g., LTE). For example, the information may identify respective CRS configurations (e.g., identifying CRS patterns, as described above) for the one or more cells of the second RAT. In some aspects, the information may identify a configuration for a reference signal (e.g., a CRS) for the second cell. The one or more cells of the second RAT (e.g., for which the UE 120 received reference signal configurations) may be respectively associated with the one or more cells of the first RAT (e.g., for which the UE 120 is to perform measurement), as described below. In some aspects, a CRS configuration may identify CRS configuration information, such as a cell identifier (e.g., for the cell associated with the CRS configuration), a v-shift parameter, a carrier bandwidth, and/or a number of CRS antenna ports, among other examples, as described above.

As shown by reference number 615, the base station 110 may transmit, and the UE 120 may receive, information identifying associations between the one or more cells of the first RAT and the one or more cells of the second RAT. In some aspects, the information may identify an association between the first cell of the first RAT (e.g., the NR cell) and the second cell of the second RAT (e.g., the LTE cell). In some aspects, the base station 110 may generate the information identifying associations between the one or more cells of the first RAT and the one or more cells of the second RAT. For example, the base station 110 may generate the information based at least in part on determining the associations between the one or more cells of the first RAT and the one or more cells of the second RAT, as described below.

In some aspects, an association between a cell of the first RAT and a cell of the second RAT may be a one-to-one association. Here, the association may indicate that first downlink signals of the cell of the first RAT (e.g., NR downlink signals) are associated with second downlink signals of the cell of the second RAT (e.g., LTE downlink signals). In some aspects, an association between a cell of the first RAT and a cell of the second RAT may associate one or more beams of the cell of the first RAT with the cell of the second RAT. For example, the association may associate an LTE cell with one or more beams (e.g., NR beams) of an NR cell. The one or more beams may be associated with one or more NR downlink signals (e.g., one or more SSBs, one or more TRSs, and/or one or more CSI-RSs among other examples).

A cell (or a beam) of the first RAT (e.g., an NR cell) may be associated with a cell of the second RAT (e.g., an LTE cell) if a base station transmits downlink signals of the first RAT (e.g., NR downlink signals, such as an SSB, a TRS, and/or a CSI-RS, among other examples) and downlink signals of the second RAT (e.g., LTE downlink signals, such as a CRS, a CSI-RS, a PSS, and/or an SSS) in a time synchronized manner (but not necessarily simultaneously), in a co-located manner (e.g., from a same TRP, from a same antenna panel, or the like), and/or using the same precoding. In other words, the association between the first cell (or beam) of the first RAT and the second cell of the second RAT may indicate at least one of that the first cell and the second cell are time synchronized, that the first cell and the second cell are co-located (e.g., implemented by the same base station) or quasi-co-located (e.g., propagation channels from the first cell and the second cell to the UE 120 have similar statistical characteristics, such as average delay, delay spread, Doppler spread, and/or beam direction), or that the first cell and the second cell use the same precoding. For example, from the perspective of the UE 120, the association between the first cell (or beam) of the first RAT and the second cell of the second RAT indicates at least one of that the first cell and the second cell are time synchronized or that the first cell and the second cell are quasi-co-located.

As shown by reference number 620, the base station 110 may transmit, and the UE 120 may receive, information identifying a relationship between first downlink signals of the first RAT (e.g., NR SSB, TRS, and/or CSI-RS) and second downlink signals of the second RAT (e.g., LTE CRS, CSI-RS, PSS, and/or SSS). In some aspects, the information may identify respective relationships for each of the associations (e.g., the associations between cell(s) of the first RAT and cell(s) of the second RAT). In some aspects, the information may identify a single relationship that is applicable to each of the associations. In some aspects, the information identifying the relationship between the first downlink signals and the second downlink signals may include a timing offset between the first downlink signals and the second downlink signals (e.g., a system frame number (SFN) offset, a subframe offset, or the like) and/or a power offset between the first downlink signals and the second downlink signals (e.g., a power difference between the first downlink signals and the second downlink signals), among other examples.

In some aspects, the information identifying the one or more cells of the first RAT for which the UE 120 is to perform measurements (as described above in connection with reference number 605), the information identifying reference signal configurations for the one or more cells of the second RAT (as described above in connection with reference number 610), the information identifying associations between the one or more cells of the first RAT and the one or more cells of the second RAT (as described above in connection with reference number 615), and the information identifying the relationship between the first downlink signals and the second downlink signals (as described above in connection with reference number 620) may be included in the same message (e.g., an RRC message) to the UE 120 or in separate messages (e.g., in two or more messages) to the UE 120. For example, the information identifying associations between the one or more cells of the first RAT and the one or more cells of the second RAT and the information identifying the relationship between the first downlink signals and the second downlink signals may be included in the same message.

As shown by reference number 625, the UE 120 may perform measurements for the one or more cells of the first RAT (e.g., NR). For example, the UE 120 may perform the measurements in accordance with a measurement configuration (e.g., as described above in connection with reference number 605). In some aspects, the UE 120 may perform a measurement for the first cell of the first RAT. In some aspects, the UE 120 may perform the measurements (e.g., NR measurements) for the one or more cells of the first RAT using an SSB, a TRS, and/or a CSI-RS. In some aspects, a measurement may be an RSSI measurement, an RSRP measurement, an RSRQ measurement, and/or a signal to interference plus noise ratio (SINR) measurement, among other examples. Additionally, or alternatively, a measurement may be a path-loss estimate between the UE 120 and the base station 110 (or the other base station 110) in connection with the first RAT (e.g., the first cell), an MCS index value used for PDSCH reception in connection with the first RAT (e.g., the first cell), a number of transmission layers (e.g., MIMO layers) used for PDSCH reception in connection with the first RAT (e.g., the first cell), and/or an aggregation level used to detect a physical downlink control channel (PDCCH) in connection with the first RAT (e.g., the first cell). As shown by reference number 630, the UE 120 may transmit, and the base station 110 may receive, a report of the measurements.

As shown by reference number 635, the UE 120 may determine that a measurement (e.g., RSSI, RSRP, RSRQ, and/or SINR) for the first cell of the first RAT satisfies (e.g., exceeds) a threshold value (e.g., a threshold RSSI value, a threshold RSRP value, a threshold RSRQ value, a threshold SINR value, a threshold path-loss estimate value, a threshold MCS index value, a threshold number of transmission layers, and/or a threshold aggregation level). A measurement for a cell satisfying a threshold value may indicate that downlink signals for the cell are received strongly at the UE 120. As shown by reference number 640, the base station 110 may transmit, and the UE 120 may receive, a PDSCH transmission of the first RAT (e.g., an NR PDSCH).

As shown by reference number 645, based at least in part on determining that the measurement for the first cell of the first RAT (e.g., NR) satisfies the threshold value, the UE 120 may perform an interference canceling operation for a reference signal (e.g., a CRS, a CSI-RS, a PSS, and/or an SSS) of the second cell of the second RAT (e.g., LTE) (e.g., because the second cell is associated with the first cell according to the information identifying associations between the one or more cells of the first RAT and the one or more cells of the second RAT). In other words, the UE 120 may perform an interference canceling operation for a reference signal (e.g., a CRS, a CSI-RS, a PSS, and/or an SSS) of the second cell of the second RAT based at least in part on the determination that the measurement for the first cell of the first RAT satisfies the threshold value and based at least in part on the association between the first cell and the second cell.

In this way, the UE 120 may use the measurement for the first cell (e.g., which the UE 120 may ordinarily collect regardless of whether the UE 120 is determining whether to perform interference canceling) to infer a level of interference from the second cell (e.g., based at least in part on the association of the first cell and the second cell), and the UE 120 may perform the interference canceling operation based at least in part on the interference being at a high level. For example, if a measured power (e.g., RSRP) for the first cell is high (e.g., exceeds a threshold value), the UE 120 may infer that interference from the second cell is also high (e.g., based at least in part on the association of the first cell and the second cell). Accordingly, the UE 120 may perform an interference canceling operation (e.g., the UE 120 may activate an interference canceling operation) for the reference signal (e.g., CRS) of the second cell when receiving the PDSCH transmission. Thus, the UE 120 may refrain from performing measurement of the reference signals (e.g., CRSs) of the second cell, thereby conserving processing resources of the UE 120.

In some aspects, to perform an interference canceling operation for the reference signal of the second cell, the UE 120 may perform estimation of propagation channel coefficients for the second cell (e.g., for the cell implementing the first cell and the second cell using DSS). The UE 120 may generate an interference replica for the reference signal (e.g., a replica of the interference signal) based at least in part on the estimation of the propagation channel coefficients. The UE 120 may perform subtraction of the generated interference replica from the PDSCH transmission received by the UE 120. In some aspects, the UE 120 may perform the interference canceling operation based at least in part on the information that identifies a reference signal (e.g., CRS) configuration for the second cell. For example, the UE 120 may perform the interference canceling operation in REs that include the reference signal (e.g., the CRS) according to the reference signal configuration (e.g., in REs within which the reference signal interferes).

In some aspects, in addition or alternatively to performing the interference canceling operation, the UE 120 may perform a de-weighting operation (or a zeroing operation) in one or more received REs that include the reference signal of the second cell (e.g., in REs within which the reference signal interferes) relative to REs that do not include the reference signal. For example, the UE 120 may perform de-weighting (or zeroing) of weightings for channel equalization and/or of log likelihood ratio (LLR) values for channel estimation of the REs that include the reference signal. The UE 120 may perform the de-weighting (or zeroing) based at least in part on determining that the measurement for the first cell of the first RAT satisfies the threshold value.

In this way, in a DSS carrier, the UE 120 may receive PDSCH transmissions for the first RAT (e.g., NR PDSCH data) with reduced interference caused by downlink reference signals (e.g., CRSs) for the second RAT. Accordingly, a performance of the PDSCH transmissions may be improved.

As indicated above, FIG. 6 is provided as an example. Other examples may differ from what is described with respect to FIG. 6.

Figure 7:
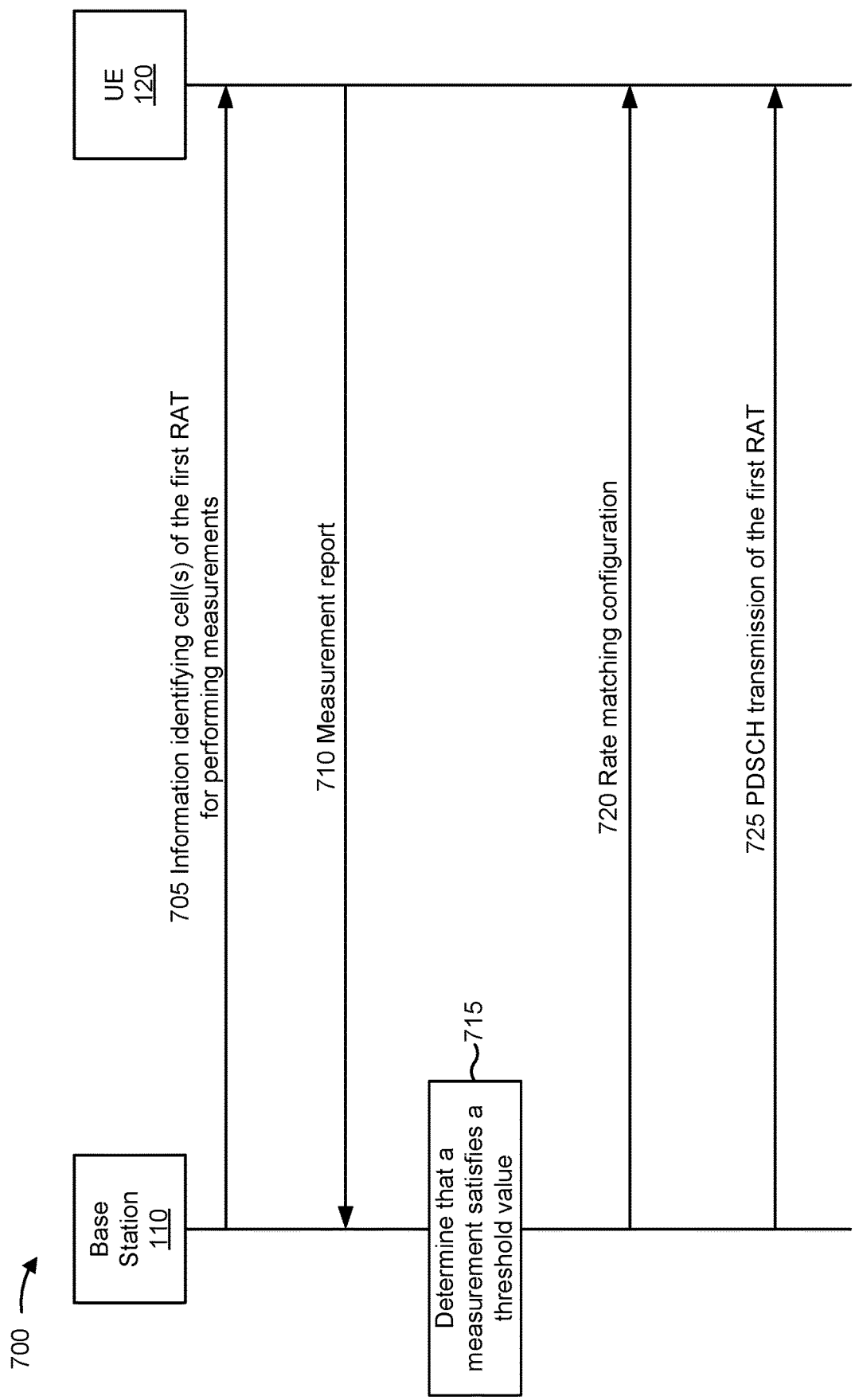
FIG. 7 is a diagram illustrating an example associated with reference signal rate matching, in accordance with the present disclosure.

FIG. 7 is a diagram illustrating an example 700 associated with reference signal rate matching, in accordance with the present disclosure. As shown in FIG. 7, example 700 includes communication between a base station 110 and a UE 120, as described above in connection with FIG. 6. In some aspects, the base station 110 may be operating in a DSS mode. For example, the base station 110 may implement a first cell of a first RAT (e.g., an NR RAT) and a second cell of a second RAT (e.g., an LTE, or E-UTRA, RAT), as described above in connection with FIG. 6. In some aspects, another base station 110 (e.g., a neighbor base station) may be operating in a DSS mode, and the other base station 110 may implement the first cell of the first RAT and the second cell of the second RAT, as described above in connection with FIG. 6.

As shown by reference number 705, the base station 110 may transmit, and the UE 120 may receive, information (e.g., a measurement configuration) identifying one or more cells (e.g., including the first cell) of the first RAT (e.g., NR) for which the UE 120 is to perform measurements (e.g., NR RRM measurements), in a similar manner as described above in connection with FIG. 6. In some aspects, the information may identify one or more measurements (e.g., an RSSI measurement, an RSRP measurement, an RSRQ measurement, and/or an SINR measurement, among other examples) that the UE 120 is to perform for the one or more cells of the first RAT. As shown by reference number 710, the UE 120 may transmit, and the base station 110 may receive, a report of the measurements.

As shown by reference number 715, the base station 110 may determine that a measurement (e.g., RSSI, RSRP, RSRQ, SINR, path-loss estimate, MCS index, number of transmission layers, and/or aggregation level) for the first cell of the first RAT satisfies (e.g., exceeds) a threshold value (e.g., a threshold RSSI value, a threshold RSRP value, a threshold RSRQ value, a threshold SINR value, a threshold path-loss estimate value, a threshold MCS index value, a threshold number of transmission layers, and/or a threshold aggregation level). In some aspects, the base station 110 may store information identifying associations between the one or more cells of the first RAT and one or more cells of the second RAT, in a similar manner as described above in connection with FIG. 6. In some aspects, the information may identify an association between the first cell of the first RAT (e.g., the NR cell) and the second cell of the second RAT (e.g., the LTE cell). In some aspects, the base station 110 may determine the associations between the one or more cells of the first RAT and the one or more cells of the second RAT, in a similar manner as described above in connection with FIG. 6. Based at least in part on the associations between the one or more cells of the first RAT and one or more cells of the second RAT, the base station 110 may determine that the first cell (e.g., associated with the measurement that satisfies the threshold value) is associated with the second cell.

As shown by reference number 720, based at least in part on determining that the measurement for the first cell of the first RAT (e.g., NR) satisfies the threshold value, the base station 110 may transmit, and the UE 120 may receive, a configuration for rate matching around one or more reference signals (e.g., CRSs, CSI-RSs, PSSs, and/or SSSs) of the second cell of the second RAT (e.g., LTE). In other words, the base station 110 may transmit the rate matching configuration for one or more reference signals (e.g., CRSs) of the second cell of the second RAT based at least in part on the determination that the measurement for the first cell of the first RAT satisfies the threshold value and based at least in part on the association between the first cell and the second cell. As described above, the rate matching configuration may identify a rate matching pattern that is to be used by the UE 120 to rate match around REs that include reference signals (e.g., CRSs, CSI-RSs, PSSs, and/or SSSs) of the second RAT when receiving a PDSCH transmission of the first RAT.

In this way, the base station 110 may use the measurement for the first cell (e.g., which the UE 120 may ordinarily report regardless of whether the base station 110 is determining whether to configure rate matching for the UE 120) to infer a level of interference from the second cell (e.g., based at least in part on the association of the first cell and the second cell), and the base station 110 may transmit the rate matching configuration based at least in part on the interference being at a high level. For example, if a measured power (e.g., RSRP) for the first cell is high (e.g., exceeds a threshold value), the base station 110 may infer that interference from the second cell is also high (e.g., based at least in part on the association of the first cell and the second cell). Accordingly, the base station 110 may configure rate matching for the UE 120 for the reference signal (e.g., CRS) of the second cell when receiving the PDSCH transmission. Thus, the UE 120 may refrain from performing measurement of the reference signals (e.g., CRSs) of the second cell, thereby conserving processing resources of the UE 120.

As shown by reference number 725, the base station 110 may transmit, and the UE 120 may receive, a PDSCH transmission of the first RAT (e.g., an NR PDSCH). For example, the base station 110 may transmit the PDSCH transmission rate matched around the REs that include reference signals (e.g., CRSs, CSI-RSs, PSSs, and/or SSSs) of the second RAT. Accordingly, the UE 120 may use the rate matching configuration to rate match around REs that include reference signals (e.g., CRSs) of the second RAT when receiving the PDSCH transmission.

In this way, in a DSS carrier, the UE 120 may receive PDSCH transmissions for the first RAT (e.g., NR PDSCH data) with reduced interference caused by downlink reference signals (e.g., CRSs) for the second RAT. Accordingly, a performance of the PDSCH transmissions may be improved.

As indicated above, FIG. 7 is provided as an example. Other examples may differ from what is described with respect to FIG. 7.

Figure 8:
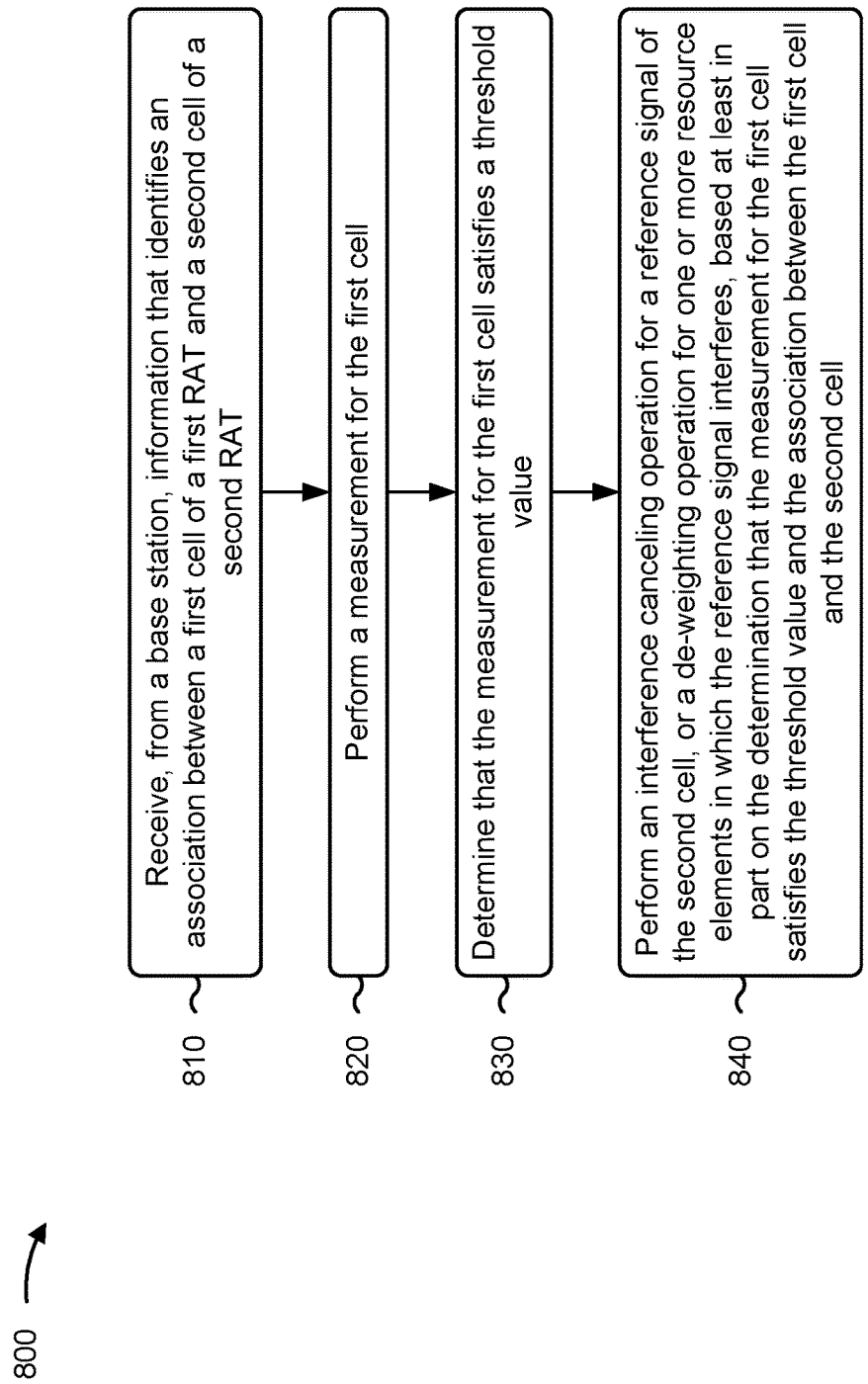
FIGS. 8-9 are diagrams illustrating example processes associated with reference signal interference canceling, in accordance with the present disclosure.

FIG. 8 is a diagram illustrating an example process 800 performed, for example, by a UE, in accordance with the present disclosure. Example process 800 is an example where the UE (e.g., UE 120) performs operations associated with reference signal interference canceling.

As shown in FIG. 8, in some aspects, process 800 may include receiving, from a base station, information that identifies an association between a first cell of a first RAT and a second cell of a second RAT (block 810). For example, the UE (e.g., using reception component 1202, depicted in FIG. 12) may receive, from a base station, information that identifies an association between a first cell of a first RAT and a second cell of a second RAT, as described above.

As further shown in FIG. 8, in some aspects, process 800 may include performing a measurement for the first cell (block 820). For example, the UE (e.g., using measurement component 1208, depicted in FIG. 12) may perform a measurement for the first cell, as described above.

As further shown in FIG. 8, in some aspects, process 800 may include determining that the measurement for the first cell satisfies a threshold value (block 830). For example, the UE (e.g., using determination component 1210, depicted in FIG. 12) may determine that the measurement for the first cell satisfies a threshold value, as described above.

As further shown in FIG. 8, in some aspects, process 800 may include performing an interference canceling operation for a reference signal of the second cell, or a de-weighting operation for one or more resource elements in which the reference signal interferes, based at least in part on the determination that the measurement for the first cell satisfies the threshold value and the association between the first cell and the second cell (block 840). For example, the UE (e.g., using interference canceling component 1212, depicted in FIG. 12) may perform an interference canceling operation for a reference signal of the second cell, or a de-weighting operation for one or more resource elements in which the reference signal interferes, based at least in part on the determination that the measurement for the first cell satisfies the threshold value and the association between the first cell and the second cell, as described above.

Process 800 may include additional aspects, such as any single aspect or any combination of aspects described below and/or in connection with one or more other processes described elsewhere herein.

In a first aspect, the reference signal is a CRS, a CSI-RS, a PSS, or an SSS.

In a second aspect, alone or in combination with the first aspect, the first RAT is an NR RAT and the second RAT is an E-UTRA RAT.

In a third aspect, alone or in combination with one or more of the first and second aspects, the measurement for the first cell is of an SSB, a TRS, or a CSI-RS.

In a fourth aspect, alone or in combination with one or more of the first through third aspects, the threshold value is an RSRP value, an RSSI value, an RSRQ value, an SINR value, a path-loss estimate value, an MCS index value, a number of transmission layers, or an aggregation level.

In a fifth aspect, alone or in combination with one or more of the first through fourth aspects, the association between the first cell and the second cell associates the first cell and one or more beams of the second cell.

In a sixth aspect, alone or in combination with one or more of the first through fifth aspects, the association between the first cell and the second cell indicates at least one of the first cell and the second cell are time synchronized, the first cell and the second cell are co-located, or the first cell and the second cell use a same precoding.

In a seventh aspect, alone or in combination with one or more of the first through sixth aspects, the first cell and the second cell share downlink time and frequency resources.

In an eighth aspect, alone or in combination with one or more of the first through seventh aspects, process 800 includes receiving (e.g., using reception component 1202) information that identifies a configuration for CRSs for the second cell.

In a ninth aspect, alone or in combination with one or more of the first through eighth aspects, the configuration identifies at least one of a cell identifier for the second cell, a v-shift parameter, a bandwidth associated with the second cell, or a number of CRS antenna ports.

In a tenth aspect, alone or in combination with one or more of the first through ninth aspects, the interference canceling operation is performed based at least in part on the configuration for the CRSs.

In an eleventh aspect, alone or in combination with one or more of the first through tenth aspects, process 800 includes receiving (e.g., using reception component 1202) information that identifies at least one of a timing offset or a power offset between a downlink signal of the first cell and the reference signal of the second cell.

In a twelfth aspect, alone or in combination with one or more of the first through eleventh aspects, process 800 includes receiving (e.g., using reception component 1202) information identifying one or more cells of the first RAT for which the UE is to perform measurements, the one or more cells including the first cell.

In a thirteenth aspect, alone or in combination with one or more of the first through twelfth aspects, performing the interference canceling operation includes generating a replica of an interference signal, and performing subtraction of the replica of the interference signal from the one or more resource elements.

In a fourteenth aspect, alone or in combination with one or more of the first through thirteenth aspects, the first cell and the second cell use an OFDM-based waveform and a same subcarrier spacing.

In a fifteenth aspect, alone or in combination with one or more of the first through fourteenth aspects, process 800 includes receiving a PDSCH transmission on the first cell, the interference canceling operation being performed when the PDSCH transmission is received.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
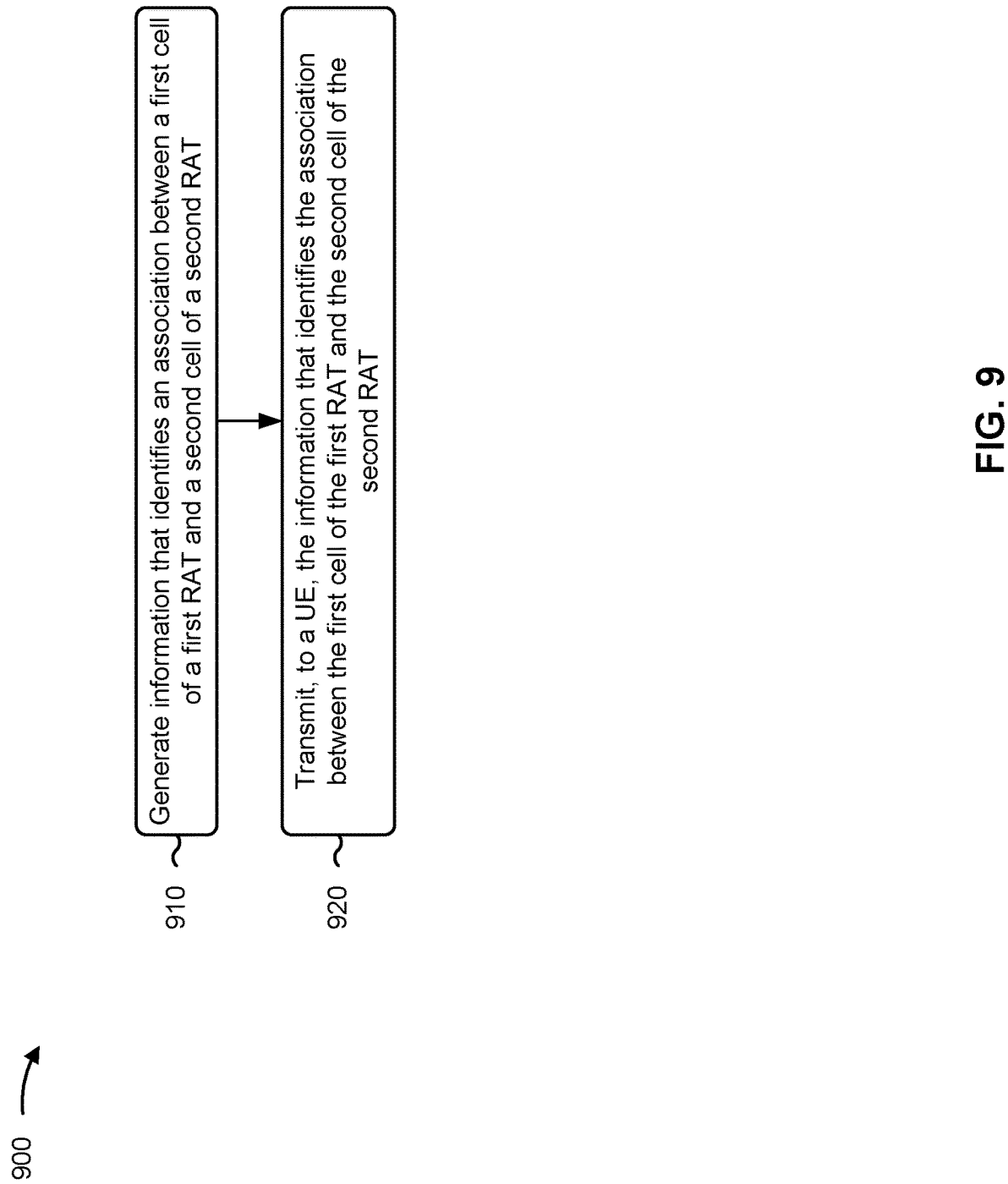

FIG. 9 is a diagram illustrating an example process 900 performed, for example, by a base station, in accordance with the present disclosure. Example process 900 is an example where the base station (e.g., base station 110) performs operations associated with reference signal interference canceling.

As shown in FIG. 9, in some aspects, process 900 may include generating information that identifies an association between a first cell of a first RAT and a second cell of a second RAT (block 910). For example, the base station (e.g., using information generation component 1308, depicted in FIG. 13) may generate information that identifies an association between a first cell of a first RAT and a second cell of a second RAT, as described above.

As further shown in FIG. 9, in some aspects, process 900 may include transmitting, to a UE, the information that identifies the association between the first cell of the first RAT and the second cell of the second RAT (block 920). For example, the base station (e.g., using transmission component 1304, depicted in FIG. 13) may transmit, to a UE, the information that identifies the association between the first cell of the first RAT and the second cell of the second RAT, as described above.

Process 900 may include additional aspects, such as any single aspect or any combination of aspects described below and/or in connection with one or more other processes described elsewhere herein.

In a first aspect, the first RAT is an NR RAT and the second RAT is an E-UTRA RAT.

In a second aspect, alone or in combination with the first aspect, the association between the first cell and the second cell associates the first cell and one or more beams of the second cell.

In a third aspect, alone or in combination with one or more of the first and second aspects, the association between the first cell and the second cell indicates at least one of the first cell and the second cell are time synchronized, the first cell and the second cell are co-located, or the first cell and the second cell use a same precoding.

In a fourth aspect, alone or in combination with one or more of the first through third aspects, the first cell and the second cell share downlink time and frequency resources.

In a fifth aspect, alone or in combination with one or more of the first through fourth aspects, process 900 includes transmitting (e.g., using transmission component 1304) information that identifies a configuration for CRSs for the second cell.

In a sixth aspect, alone or in combination with one or more of the first through fifth aspects, the configuration identifies at least one of a cell identifier for the second cell, a v-shift parameter, a bandwidth associated with the second cell, or a number of CRS antenna ports.

In a seventh aspect, alone or in combination with one or more of the first through sixth aspects, process 900 includes transmitting (e.g., using transmission component 1304) information that identifies at least one of a timing offset or a power offset between a downlink signal of the first cell and a reference signal of the second cell.

In an eighth aspect, alone or in combination with one or more of the first through seventh aspects, process 900 includes transmitting (e.g., using transmission component 1304) information identifying one or more cells of the first RAT for which the UE is to perform measurements, the one or more cells including the first cell.

In a ninth aspect, alone or in combination with one or more of the first through eighth aspects, the first cell and the second cell use an OFDM-based waveform and a same subcarrier spacing.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
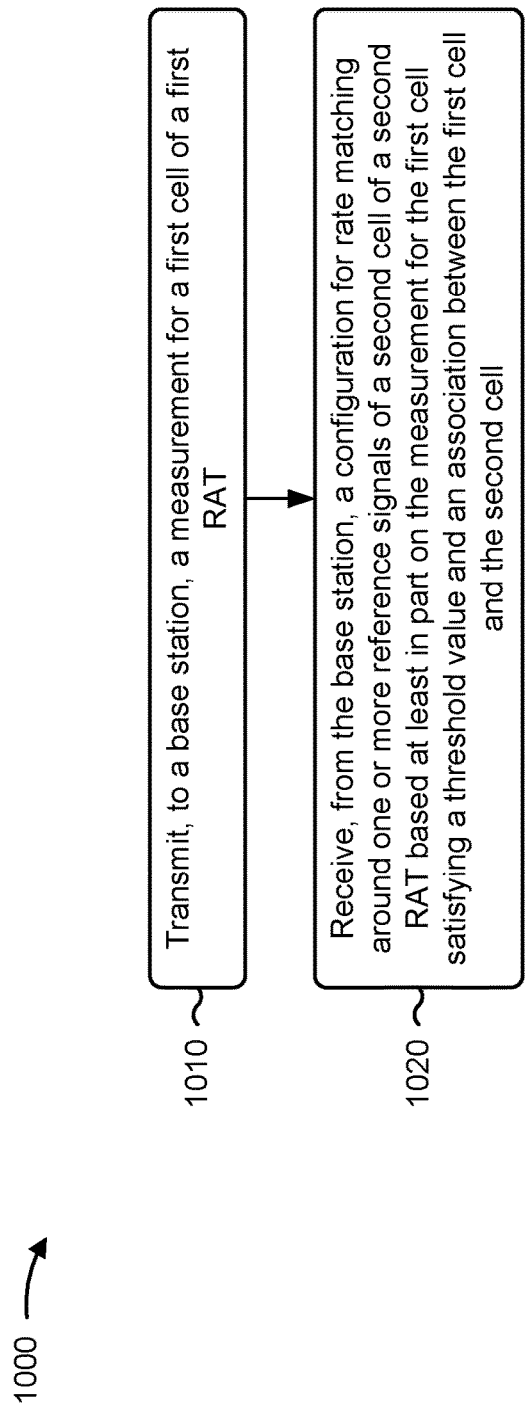
FIGS. 10-11 are diagrams illustrating example processes associated with reference signal rate matching, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with reference signal rate matching.

As shown in FIG. 10, in some aspects, process 1000 may include transmitting, to a base station, a measurement for a first cell of a first RAT (block 1010). For example, the UE (e.g., using transmission component 1204, depicted in FIG. 12) may transmit, to a base station, a measurement for a first cell of a first RAT, as described above.

As further shown in FIG. 10, in some aspects, process 1000 may include receiving, from the base station, a configuration for rate matching around one or more reference signals of a second cell of a second RAT based at least in part on the measurement for the first cell satisfying a threshold value and an association between the first cell and the second cell (block 1020). For example, the UE (e.g., using reception component 1202, depicted in FIG. 12) may receive, from the base station, a configuration for rate matching around one or more reference signals of a second cell of a second RAT based at least in part on the measurement for the first cell satisfying a threshold value and an association between the first cell and the second cell, as described above.

Process 1000 may include additional aspects, such as any single aspect or any combination of aspects described below and/or in connection with one or more other processes described elsewhere herein.

In a first aspect, the one or more reference signals include a CRS, a CSI-RS, a PSS, or an SSS.

In a second aspect, alone or in combination with the first aspect, the first RAT is an NR RAT and the second RAT is an E-UTRA RAT.

In a third aspect, alone or in combination with one or more of the first and second aspects, the measurement for the first cell is of an SSB, a TRS, or a CSI-RS.

In a fourth aspect, alone or in combination with one or more of the first through third aspects, the threshold value is an RSRP value, an RSSI value, an RSRQ value, an SINR value, a path-loss estimate value, an MCS index value, a number of transmission layers, or an aggregation level.

In a fifth aspect, alone or in combination with one or more of the first through fourth aspects, the association between the first cell and the second cell indicates at least one of the first cell and the second cell are time synchronized, the first cell and the second cell are co-located, or the first cell and the second cell use a same precoding.

In a sixth aspect, alone or in combination with one or more of the first through fifth aspects, the first cell and the second cell share downlink time and frequency resources.

In a seventh aspect, alone or in combination with one or more of the first through sixth aspects, process 1000 includes receiving (e.g., using reception component 1202) information identifying one or more cells of the first RAT for which the UE is to perform measurements, the one or more cells including the first cell.

In an eighth aspect, alone or in combination with one or more of the first through seventh aspects, the first cell and the second cell use an OFDM-based waveform and a same subcarrier spacing.

In a ninth aspect, alone or in combination with one or more of the first through eighth aspects, process 1000 includes receiving a PDSCH transmission on the first cell using the configuration for rate matching.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
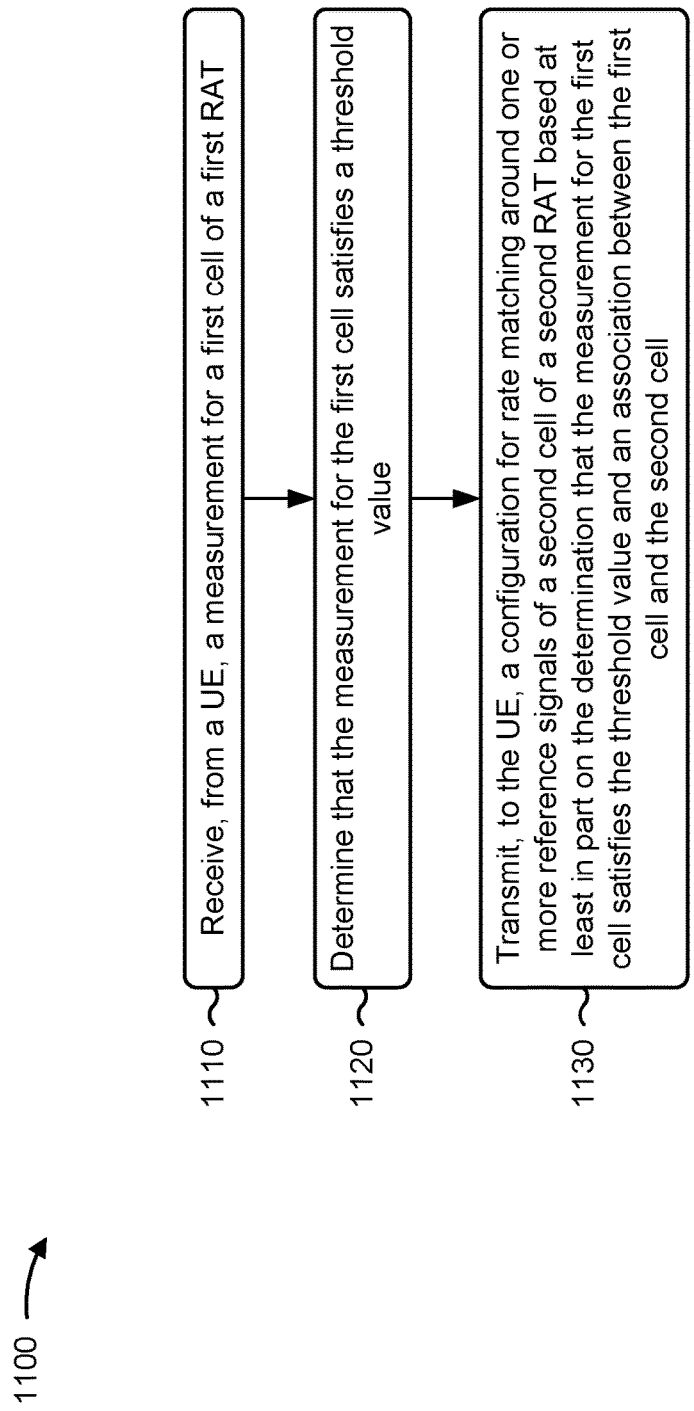

FIG. 11 is a diagram illustrating an example process 1100 performed, for example, by a base station, in accordance with the present disclosure. Example process 1100 is an example where the base station (e.g., base station 110) performs operations associated with reference signal rate matching.

As shown in FIG. 11, in some aspects, process 1100 may include receiving, from a UE, a measurement for a first cell of a first RAT (block 1110). For example, the base station (e.g., using reception component 1302, depicted in FIG. 13) may receive, from a UE, a measurement for a first cell of a first RAT, as described above.

As further shown in FIG. 11, in some aspects, process 1100 may include determining that the measurement for the first cell satisfies a threshold value (block 1120). For example, the base station (e.g., using determination component 1310, depicted in FIG. 13) may determine that the measurement for the first cell satisfies a threshold value, as described above.

As further shown in FIG. 11, in some aspects, process 1100 may include transmitting, to the UE, a configuration for rate matching around one or more reference signals of a second cell of a second RAT based at least in part on the determination that the measurement for the first cell satisfies the threshold value and an association between the first cell and the second cell (block 1130). For example, the base station (e.g., using transmission component 1304, depicted in FIG. 13) may transmit, to the UE, a configuration for rate matching around one or more reference signals of a second cell of a second RAT based at least in part on the determination that the measurement for the first cell satisfies the threshold value and an association between the first cell and the second cell, as described above.

Process 1100 may include additional aspects, such as any single aspect or any combination of aspects described below and/or in connection with one or more other processes described elsewhere herein.

In a first aspect, the one or more reference signals include a CRS, a CSI-RS, a PSS, or an SSS.

In a second aspect, alone or in combination with the first aspect, the first RAT is an NR RAT and the second RAT is an E-UTRA RAT.

In a third aspect, alone or in combination with one or more of the first and second aspects, the measurement for the first cell is of an SSB, a TRS, or a CSI-RS.

In a fourth aspect, alone or in combination with one or more of the first through third aspects, the threshold value is an RSRP value, an RSSI value, an RSRQ value, an SINR value, a path-loss estimate value, an MCS index value, a number of transmission layers, or an aggregation level.

In a fifth aspect, alone or in combination with one or more of the first through fourth aspects, the association between the first cell and the second cell indicates at least one of the first cell and the second cell are time synchronized, the first cell and the second cell are co-located, or the first cell and the second cell use a same precoding.

In a sixth aspect, alone or in combination with one or more of the first through fifth aspects, the first cell and the second cell share downlink time and frequency resources.

In a seventh aspect, alone or in combination with one or more of the first through sixth aspects, process 1100 includes transmitting (e.g., using transmission component 1304) information identifying one or more cells of the first RAT for which the UE is to perform measurements, the one or more cells including the first cell.

In an eighth aspect, alone or in combination with one or more of the first through seventh aspects, the first cell and the second cell use an OFDM-based waveform and a same subcarrier spacing.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
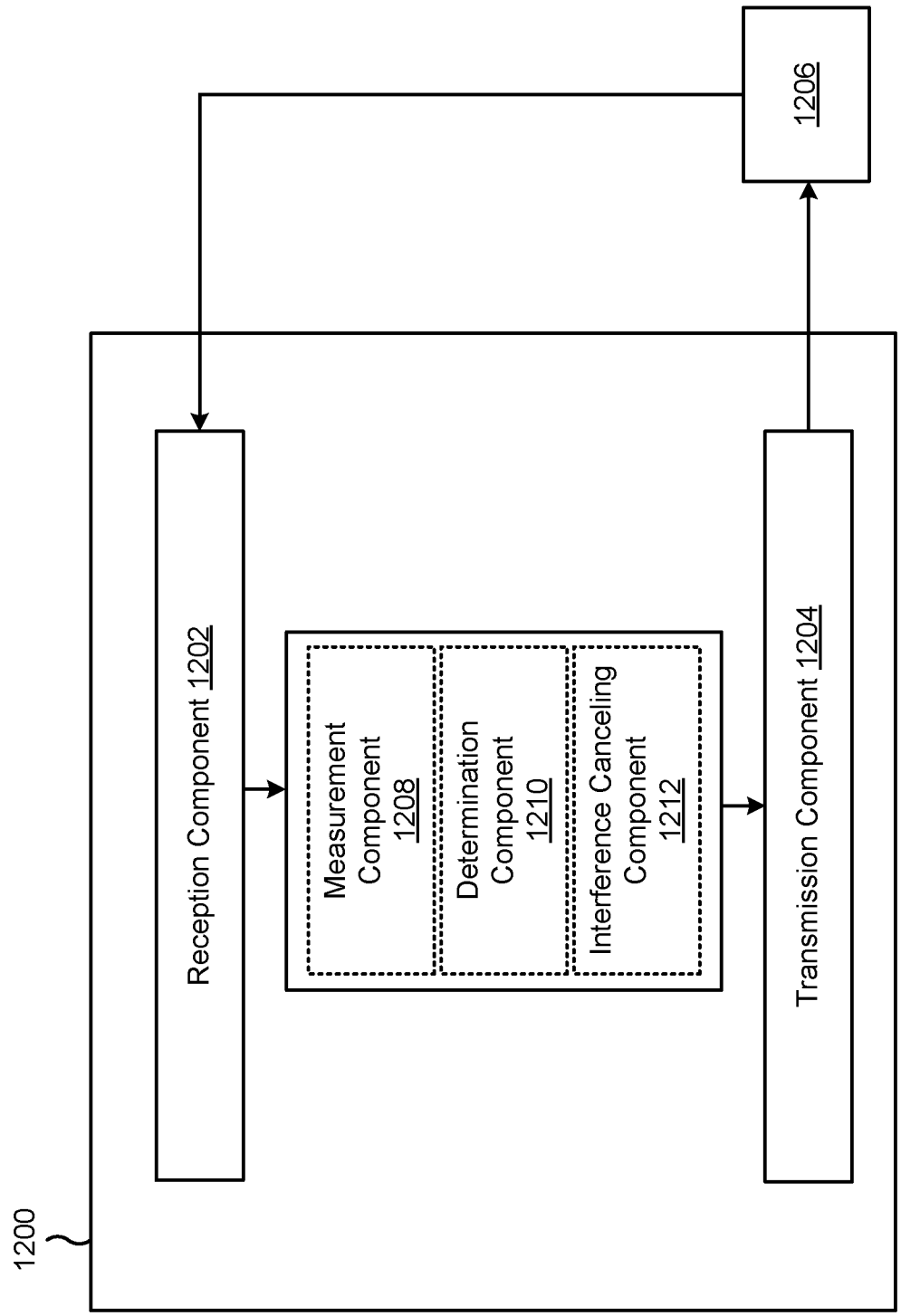
FIG. 12 is a block diagram of an example apparatus for wireless communication, in accordance with the present disclosure.

FIG. 12 is a block diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include one or more of a measurement component 1208, a determination component 1210, or an interference canceling component 1212, among other examples.

In some aspects, the apparatus 1200 may be configured to perform one or more operations described herein in connection with FIGS. 6-7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE described above in connection with FIG. 2. In some aspects, the transmission component 1204 may be co-located with the reception component 1202 in a transceiver.

The reception component 1202 may receive, from a base station, information that identifies an association between a first cell of a first RAT and a second cell of a second RAT. The measurement component 1208 may perform a measurement for the first cell. The determination component 1210 may determine that the measurement for the first cell satisfies a threshold value. The interference canceling component 1212 may perform an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

In some aspects, the measurement component 1208 may include a controller/processor, a memory, or a combination thereof, of the UE described above in connection with FIG. 2. In some aspects, the determination component 1210 may include a controller/processor, a memory, or a combination thereof, of the UE described above in connection with FIG. 2. In some aspects, the interference canceling component 1212 may include a controller/processor, a memory, or a combination thereof, of the UE described above in connection with FIG. 2.

The reception component 1202 may receive information that identifies a configuration for CRSs for the second cell. The reception component 1202 may receive information that identifies at least one of a timing offset or a power offset between a downlink signal of the first cell and the reference signal of the second cell. The reception component 1202 may receive information identifying one or more cells of the first RAT for which the UE is to perform measurements (e.g., the one or more cells including the first cell).

The transmission component 1204 may transmit, to a base station, a measurement for a first cell of a first RAT. The reception component 1302 may receive, from the base station, a configuration for rate matching around one or more reference signals of a second cell of a second RAT based at least in part on the measurement for the first cell satisfying a threshold value and an association between the first cell and the second cell. The reception component 1202 may receive information identifying one or more cells of the first RAT for which the UE is to perform measurements (e.g., the one or more cells including the first cell).

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
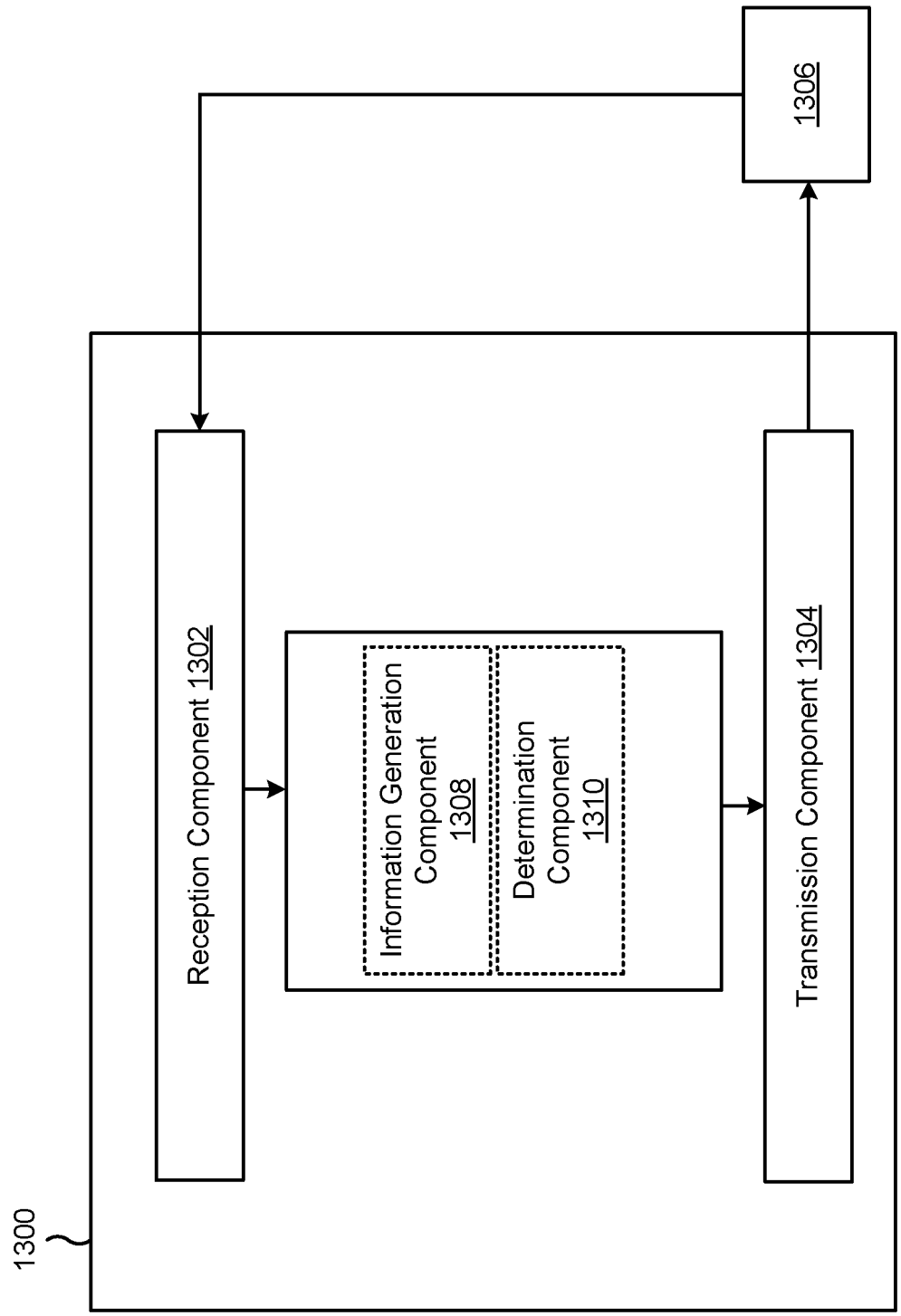
FIG. 13 is a block diagram of an example apparatus for wireless communication, in accordance with the present disclosure.

FIG. 13 is a block diagram of an example apparatus 1300 for wireless communication. The apparatus 1300 may be a base station, or a base station may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include one or more of an information generation component 1308 or a determination component 1310, among other examples.

In some aspects, the apparatus 1300 may be configured to perform one or more operations described herein in connection with FIGS. 6-7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the base station described above in connection with FIG. 2. Additionally, or alternatively, one or more components shown in FIG. 13 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1306. In some aspects, the reception component 1302 may include one or more antennas, a demodulator, a MIMO detector, a receive processor, a controller/processor, a memory, or a combination thereof, of the base station described above in connection with FIG. 2.

The transmission component 1304 may transmit communications, such as reference signals, control information, data communications, or a combination thereof, to the apparatus 1306. In some aspects, one or more other components of the apparatus 1306 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modulator, a transmit MIMO processor, a transmit processor, a controller/processor, a memory, or a combination thereof, of the base station described above in connection with FIG. 2. In some aspects, the transmission component 1304 may be co-located with the reception component 1302 in a transceiver.

The information generation component 1308 may generate information that identifies an association between a first cell of a first RAT and a second cell of a second RAT. The transmission component 1304 may transmit, to a UE, the information that identifies the association between the first cell of the first RAT and the second cell of the second RAT.

The transmission component 1304 may transmit information that identifies a configuration for CRSs for the second cell. The transmission component 1304 may transmit information that identifies at least one of a timing offset or a power offset between a downlink signal of the first cell and a reference signal of the second cell. The transmission component 1304 may transmit information identifying one or more cells of the first RAT for which the UE is to perform measurements (e.g., the one or more cells including the first cell).

The reception component 1302 may receive, from a UE, a measurement for a first cell of a first RAT. The determination component 1310 may determine that the measurement for the first cell satisfies a threshold value. In some aspects, the determination component 1310 may include a controller/processor, a memory, or a combination thereof, of the base station described above in connection with FIG. 2. The transmission component 1304 may transmit, to the UE, a configuration for rate matching around one or more reference signals of a second cell of a second RAT based at least in part on the determination that the measurement for the first cell satisfies the threshold value and an association between the first cell and the second cell. The transmission component 1304 may transmit information identifying one or more cells of the first RAT for which the UE is to perform measurements (e.g., the one or more cells including the first cell).

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a base station, information that identifies an association between a first cell of a first radio access technology (RAT) and a second cell of a second RAT; performing a measurement for the first cell; determining that the measurement for the first cell satisfies a threshold value; and performing an interference canceling operation for a reference signal of the second cell, or a de-weighting operation for one or more resource elements in which the reference signal interferes, based at least in part on the determination that the measurement for the first cell satisfies the threshold value and the association between the first cell and the second cell.

Aspect 2: The method of Aspect 1, wherein the reference signal is a cell-specific reference signal, a channel state information reference signal, a primary synchronization signal, or a secondary synchronization signal.

Aspect 3: The method of any of Aspects 1-2, wherein the first RAT is a New Radio RAT and the second RAT is an Evolved Universal Mobile Telecommunications System Terrestrial Radio Access RAT.

Aspect 4: The method of any of Aspects 1-3, wherein the measurement for the first cell is of a synchronization signal block, a tracking reference signal, or a channel state information reference signal.

Aspect 5: The method of any of Aspects 1-4, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

Aspect 6: The method of any of Aspects 1-5, wherein the association between the first cell and the second cell associates the first cell and one or more beams of the second cell.

Aspect 7: The method of any of Aspects 1-6, wherein the association between the first cell and the second cell indicates at least one of: the first cell and the second cell are time synchronized; the first cell and the second cell are co-located; or the first cell and the second cell use a same precoding.

Aspect 8: The method of any of Aspects 1-7, wherein the first cell and the second cell share downlink time and frequency resources.

Aspect 9: The method of any of Aspects 1-8, further comprising: receiving information that identifies a configuration for cell-specific reference signals for the second cell.

Aspect 10: The method of Aspect 9, wherein the configuration identifies at least one of a cell identifier for the second cell, a v-shift parameter, a bandwidth associated with the second cell, or a number of cell-specific reference signal antenna ports.

Aspect 11: The method of any of Aspects 9-10, wherein the interference canceling operation is performed based at least in part on the configuration for the cell-specific reference signals.

Aspect 12: The method of any of Aspects 1-11, further comprising: receiving information that identifies at least one of a timing offset or a power offset between a downlink signal of the first cell and the reference signal of the second cell.

Aspect 13: The method of any of Aspects 1-12, further comprising: receiving information identifying one or more cells of the first RAT for which the UE is to perform measurements, the one or more cells including the first cell.

Aspect 14: The method of any of Aspects 1-13, wherein performing the interference canceling operation comprises: generating a replica of an interference signal; and performing subtraction of the replica of the interference signal from the one or more resource elements.

Aspect 15: The method of any of Aspects 1-14, wherein the first cell and the second cell use an orthogonal frequency division multiplexing (OFDM)-based waveform and a same subcarrier spacing.

Aspect 16: The method of any of Aspects 1-15, further comprising: receiving a physical downlink shared channel (PDSCH) transmission on the first cell, the interference canceling operation being performed when the PDSCH transmission is received.

Aspect 17: A method of wireless communication performed by a base station, comprising: generating information that identifies an association between a first cell of a first radio access technology (RAT) and a second cell of a second RAT; and transmitting, to a user equipment (UE), the information that identifies the association between the first cell of the first RAT and the second cell of the second RAT.

Aspect 18: The method of Aspect 17, wherein the first RAT is a New Radio RAT and the second RAT is an Evolved Universal Mobile Telecommunications System Terrestrial Radio Access RAT.

Aspect 19: The method of any of Aspects 17-18, wherein the association between the first cell and the second cell associates the first cell and one or more beams of the second cell.

Aspect 20: The method of any of Aspects 17-19, wherein the association between the first cell and the second cell indicates at least one of: the first cell and the second cell are time synchronized; the first cell and the second cell are co-located; or the first cell and the second cell use a same precoding.

Aspect 21: The method of Aspect 20, wherein the first cell and the second cell share downlink time and frequency resources.

Aspect 22: The method of any of Aspects 17-21, further comprising: transmitting information that identifies a configuration for cell-specific reference signals for the second cell.

Aspect 23: The method of Aspect 22, wherein the configuration identifies at least one of a cell identifier for the second cell, a v-shift parameter, a bandwidth associated with the second cell, or a number of cell-specific reference signal antenna ports.

Aspect 24: The method of any of Aspects 17-23, further comprising: transmitting information that identifies at least one of a timing offset or a power offset between a downlink signal of the first cell and a reference signal of the second cell.

Aspect 25: The method of any of Aspects 17-24, further comprising: transmitting information identifying one or more cells of the first RAT for which the UE is to perform measurements, the one or more cells including the first cell.

Aspect 26: The method of any of Aspects 17-25, wherein the first cell and the second cell use an orthogonal frequency division multiplexing (OFDM)-based waveform and a same subcarrier spacing.

Aspect 27: A method of wireless communication performed by a user equipment (UE), comprising: transmitting, to a base station, a measurement for a first cell of a first radio access technology (RAT); and receiving, from the base station, a configuration for rate matching around one or more reference signals of a second cell of a second RAT based at least in part on the measurement for the first cell satisfying a threshold value and an association between the first cell and the second cell.

Aspect 28: The method of Aspect 27, wherein the one or more reference signals include a cell-specific reference signal, a channel state information reference signal, a primary synchronization signal, or a secondary synchronization signal.

Aspect 29: The method of any of Aspects 27-28, wherein the first RAT is a New Radio RAT and the second RAT is an Evolved Universal Mobile Telecommunications System Terrestrial Radio Access RAT.

Aspect 30: The method of any of Aspects 27-29, wherein the measurement for the first cell is of a synchronization signal block, a tracking reference signal, or a channel state information reference signal.

Aspect 31: The method of any of Aspects 27-30, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

Aspect 32: The method of any of Aspects 27-31, wherein the association between the first cell and the second cell indicates at least one of: the first cell and the second cell are time synchronized; the first cell and the second cell are co-located; or the first cell and the second cell use a same precoding.

Aspect 33: The method of any of Aspects 27-32, wherein the first cell and the second cell share downlink time and frequency resources.

Aspect 34: The method of any of Aspects 27-33, further comprising: receiving information identifying one or more cells of the first RAT for which the UE is to perform measurements, the one or more cells including the first cell.

Aspect 35: The method of any of Aspects 27-34, wherein the first cell and the second cell use an orthogonal frequency division multiplexing (OFDM)-based waveform and a same subcarrier spacing.

Aspect 36: The method of any of Aspects 27-35, further comprising: receiving a physical downlink shared channel transmission on the first cell using the configuration for rate matching.

Aspect 37: A method of wireless communication performed by a base station, comprising: receiving, from a user equipment (UE), a measurement for a first cell of a first radio access technology (RAT); determining that the measurement for the first cell satisfies a threshold value; and transmitting, to the UE, a configuration for rate matching around one or more reference signals of a second cell of a second RAT based at least in part on the determination that the measurement for the first cell satisfies the threshold value and an association between the first cell and the second cell.

Aspect 38: The method of Aspect 37, wherein the one or more reference signals include a cell-specific reference signal, a channel state information reference signal, a primary synchronization signal, or a secondary synchronization signal.

Aspect 39: The method of any of Aspects 37-38, wherein the first RAT is a New Radio RAT and the second RAT is an Evolved Universal Mobile Telecommunications System Terrestrial Radio Access RAT.

Aspect 40: The method of any of Aspects 37-39, wherein the measurement for the first cell is of a synchronization signal block, a tracking reference signal, or a channel state information reference signal.

Aspect 41: The method of any of Aspects 37-40, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

Aspect 42: The method of any of Aspects 37-41, wherein the association between the first cell and the second cell indicates at least one of: the first cell and the second cell are time synchronized; the first cell and the second cell are co-located; or the first cell and the second cell use a same precoding.

Aspect 43: The method of any of Aspects 37-42, wherein the first cell and the second cell share downlink time and frequency resources.

Aspect 44: The method of any of Aspects 37-43, further comprising: transmitting information identifying one or more cells of the first RAT for which the UE is to perform measurements, the one or more cells including the first cell.

Aspect 45: The method of any of Aspects 37-44, wherein the first cell and the second cell use an orthogonal frequency division multiplexing (OFDM)-based waveform and a same subcarrier spacing.

Aspect 46: An apparatus for wireless communication at a device, comprising a processor; memory coupled with the processor; and instructions stored in the memory and executable by the processor to cause the apparatus to perform the method of one or more of Aspects 1-16.

Aspect 47: A device for wireless communication, comprising a memory and one or more processors coupled to the memory, the one or more processors configured to perform the method of one or more of Aspects 1-16.

Aspect 48: An apparatus for wireless communication, comprising at least one means for performing the method of one or more of Aspects 1-16.

Aspect 49: A non-transitory computer-readable medium storing code for wireless communication, the code comprising instructions executable by a processor to perform the method of one or more of Aspects 1-16.

Aspect 50: A non-transitory computer-readable medium storing a set of instructions for wireless communication, the set of instructions comprising one or more instructions that, when executed by one or more processors of a device, cause the device to perform the method of one or more of Aspects 1-16.

Aspect 51: An apparatus for wireless communication at a device, comprising a processor; memory coupled with the processor; and instructions stored in the memory and executable by the processor to cause the apparatus to perform the method of one or more of Aspects 17-26.

Aspect 52: A device for wireless communication, comprising a memory and one or more processors coupled to the memory, the one or more processors configured to perform the method of one or more of Aspects 17-26.

Aspect 53: An apparatus for wireless communication, comprising at least one means for performing the method of one or more of Aspects 17-26.

Aspect 54: A non-transitory computer-readable medium storing code for wireless communication, the code comprising instructions executable by a processor to perform the method of one or more of Aspects 17-26.

Aspect 55: A non-transitory computer-readable medium storing a set of instructions for wireless communication, the set of instructions comprising one or more instructions that, when executed by one or more processors of a device, cause the device to perform the method of one or more of Aspects 17-26.

Aspect 56: An apparatus for wireless communication at a device, comprising a processor; memory coupled with the processor; and instructions stored in the memory and executable by the processor to cause the apparatus to perform the method of one or more of Aspects 27-36.

Aspect 57: A device for wireless communication, comprising a memory and one or more processors coupled to the memory, the one or more processors configured to perform the method of one or more of Aspects 27-36.

Aspect 58: An apparatus for wireless communication, comprising at least one means for performing the method of one or more of Aspects 27-36.

Aspect 59: A non-transitory computer-readable medium storing code for wireless communication, the code comprising instructions executable by a processor to perform the method of one or more of Aspects 27-36.

Aspect 60: A non-transitory computer-readable medium storing a set of instructions for wireless communication, the set of instructions comprising one or more instructions that, when executed by one or more processors of a device, cause the device to perform the method of one or more of Aspects 27-36.

Aspect 61: An apparatus for wireless communication at a device, comprising a processor; memory coupled with the processor; and instructions stored in the memory and executable by the processor to cause the apparatus to perform the method of one or more of Aspects 37-45.

Aspect 62: A device for wireless communication, comprising a memory and one or more processors coupled to the memory, the one or more processors configured to perform the method of one or more of Aspects 37-45.

Aspect 63: An apparatus for wireless communication, comprising at least one means for performing the method of one or more of Aspects 37-45.

Aspect 64: A non-transitory computer-readable medium storing code for wireless communication, the code comprising instructions executable by a processor to perform the method of one or more of Aspects 37-45.

Aspect 65: A non-transitory computer-readable medium storing a set of instructions for wireless communication, the set of instructions comprising one or more instructions that, when executed by one or more processors of a device, cause the device to perform the method of one or more of Aspects 37-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
transmitting, to a network entity, a measurement for a first cell of a first radio access technology (RAT); and
receiving, from the network entity, a configuration for rate matching around one or more reference signals of a second cell of a second RAT based at least in part on the measurement for the first cell satisfying a threshold value and an association between the first cell and the second cell,
wherein the association between the first cell and the second cell is based at least in part on downlink signals of the first RAT and downlink signals of the second RAT being at least one of transmitted in a time synchronized manner, transmitted from a same transmission reception point (TRP), transmitted from a same antenna panel, or transmitted using a same precoding.

2. The method of claim 1, wherein the one or more reference signals include a cell-specific reference signal, a channel state information reference signal, a primary synchronization signal, or a secondary synchronization signal.

3. The method of claim 1, wherein the first RAT is a New Radio RAT and the second RAT is an Evolved Universal Mobile Telecommunications System Terrestrial Radio Access RAT.

4. The method of claim 1, wherein the measurement for the first cell is of a synchronization signal block, a tracking reference signal, or a channel state information reference signal.

5. The method of claim 1, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

6. The method of claim 1, further comprising:
receiving information identifying one or more cells of the first RAT for which the UE is to perform measurements, the one or more cells including the first cell.

7. The method of claim 1, further comprising:
receiving a physical downlink shared channel transmission on the first cell using the configuration for rate matching.

8. A method of wireless communication performed by a network entity, comprising:
receiving, from a user equipment (UE), a measurement for a first cell of a first radio access technology (RAT);
determining that the measurement for the first cell satisfies a threshold value; and
transmitting, to the UE, a configuration for rate matching around one or more reference signals of a second cell of a second RAT based at least in part on the determination that the measurement for the first cell satisfies the threshold value and an association between the first cell and the second cell,
wherein the association between the first cell and the second cell is based at least in part on downlink signals of the first RAT and downlink signals of the second RAT being at least one of transmitted in a time synchronized manner, transmitted from a same transmission reception point (TRP), transmitted from a same antenna panel, or transmitted using a same precoding.

9. The method of claim 8, wherein the first RAT is a New Radio RAT and the second RAT is an Evolved Universal Mobile Telecommunications System Terrestrial Radio Access RAT.

10. The method of claim 8, wherein the measurement for the first cell is of a synchronization signal block, a tracking reference signal, or a channel state information reference signal.

11. The method of claim 8, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

12. The method of claim 8, further comprising:
transmitting information identifying one or more cells of the first RAT for which the UE is to perform measurements, the one or more cells including the first cell.

13. The method of claim 8, wherein the configuration for rate matching is transmitted based at least in part on a level of interference from the second cell satisfying a threshold.

14. The method of claim 8, further comprising:
transmitting a physical downlink shared channel (PDSCH) transmission of the first RAT based at least in part on transmitting the configuration for rate matching.

15. The method of claim 14, wherein the PDSCH transmission is rate matched around resource elements (REs) that include the one or more reference signals.

16. A user equipment (UE) for wireless communication, comprising:
one or more memories; and
one or more processors, coupled to the one or more memories, configured to cause the UE to:
transmit, to a network entity, a measurement for a first cell of a first radio access technology (RAT); and
receive, from the network entity, a configuration for rate matching around one or more reference signals of a second cell of a second RAT based at least in part on the measurement for the first cell satisfying a threshold value and an association between the first cell and the second cell,
wherein the association between the first cell and the second cell is based at least in part on downlink signals of the first RAT and downlink signals of the second RAT being at least one of transmitted in a time synchronized manner, transmitted from a same transmission reception point (TRP), transmitted from a same antenna panel, or transmitted using a same precoding.

17. The UE of claim 16, wherein the one or more reference signals include a cell-specific reference signal, a channel state information reference signal, a primary synchronization signal, or a secondary synchronization signal.

18. The UE of claim 16, wherein the first RAT is a New Radio RAT and the second RAT is an Evolved Universal Mobile Telecommunications System Terrestrial Radio Access RAT.

19. The UE of claim 16, wherein the measurement for the first cell is of a synchronization signal block, a tracking reference signal, or a channel state information reference signal.

20. The UE of claim 16, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

21. The UE of claim 16, wherein the one or more processors are further configured to cause the UE to:
receive information identifying one or more cells of the first RAT for which the UE is to perform measurements, the one or more cells including the first cell.

22. The UE of claim 16, wherein the one or more processors are further configured to cause the UE to:
receive a physical downlink shared channel transmission on the first cell using the configuration for rate matching.

23. A network entity for wireless communication, comprising:
one or more memories; and
one or more processors, coupled to the one or more memories, configured to cause the network entity to:
receive, from a user equipment (UE), a measurement for a first cell of a first radio access technology (RAT);
determine that the measurement for the first cell satisfies a threshold value; and
transmit, to the UE, a configuration for rate matching around one or more reference signals of a second cell of a second RAT based at least in part on the determination that the measurement for the first cell satisfies the threshold value and an association between the first cell and the second cell,
wherein the association between the first cell and the second cell is based at least in part on downlink signals of the first RAT and downlink signals of the second RAT being at least one of transmitted in a time synchronized manner, transmitted from a same transmission reception point (TRP), transmitted from a same antenna panel, or transmitted using a same precoding.

24. The network entity of claim 23, wherein the first RAT is a New Radio RAT and the second RAT is an Evolved Universal Mobile Telecommunications System Terrestrial Radio Access RAT.

25. The network entity of claim 23, wherein the measurement for the first cell is of a synchronization signal block, a tracking reference signal, or a channel state information reference signal.

26. The network entity of claim 23, wherein the threshold value is a reference signal received power value, a received signal strength indicator value, a reference signal received quality value, a signal to interference plus noise ratio value, a path-loss estimate value, a modulation and coding scheme index value, a number of transmission layers, or an aggregation level.

27. The network entity of claim 23, wherein the one or more processors are further configured to cause the network entity to:
transmit information identifying one or more cells of the first RAT for which the UE is to perform measurements, the one or more cells including the first cell.

28. The network entity of claim 23, wherein the configuration for rate matching is transmitted based at least in part on a level of interference from the second cell satisfying a threshold.

29. The network entity of claim 23, wherein the one or more processors are further configured to cause the network entity to:
transmit a physical downlink shared channel (PDSCH) transmission of the first RAT based at least in part on transmitting the configuration for rate matching.

30. The network entity of claim 29, wherein the PDSCH transmission is rate matched around resource elements (REs) that include the one or more reference signals.

* * * * *